United States Patent [19]

Balzeit et al.

[11] Patent Number: 5,355,156
[45] Date of Patent: Oct. 11, 1994

[54] DEVICE FOR AUTOMATICALLY CLAMPING AND RELEASING RECORDING MATERIAL AND OPERATION OF SAID DEVICE

[75] Inventors: Ralf Balzeit, Preetz; Gunnar Behrens, Kiel Russee; Gerhard Bloehdorn, Schoenkirchen; Bernd Lassen, Moenkeberg; Hans Penza, Preetz; Norbert Roth, Kiel, all of Fed. Rep. of Germany

[73] Assignee: Linotype-Hell AG, Kiel, Fed. Rep. of Germany

[21] Appl. No.: 834,577

[22] PCT Filed: Aug. 9, 1990

[86] PCT No.: PCT/DE90/00613

§ 371 Date: Feb. 18, 1992

§ 102(e) Date: Feb. 18, 1992

[87] PCT Pub. No.: WO91/03120

PCT Pub. Date: Mar. 7, 1991

[30] Foreign Application Priority Data

Aug. 17, 1989 [DE] Fed. Rep. of Germany ....... 3927162
Nov. 20, 1989 [DE] Fed. Rep. of Germany ....... 3938480

[51] Int. Cl.$^5$ ............................................. H04N 1/08
[52] U.S. Cl. .................................... 346/138; 271/196; 271/276; 346/24
[58] Field of Search .................... 355/29, 73, 312, 72; 346/24, 134, 136, 138; 271/194, 196, 276

[56] References Cited

U.S. PATENT DOCUMENTS

| | | | |
|---|---|---|---|
| 3,343,173 | 9/1967 | Cooley | 346/24 |
| 3,722,999 | 3/1973 | Cunha et al. | 355/29 X |
| 3,813,682 | 5/1974 | Nishikawa et al. | 95/31 R |
| 3,908,981 | 9/1975 | Naroff | |
| 4,052,731 | 10/1977 | Powers | 354/275 |
| 4,157,178 | 6/1973 | Ollendick | 271/276 |
| 4,202,542 | 5/1980 | Lammers et al. | 271/276 |
| 4,298,272 | 11/1981 | Stievenart et al. | 355/28 |

(List continued on next page.)

FOREIGN PATENT DOCUMENTS

| | | |
|---|---|---|
| 2023390 | 5/1970 | Fed. Rep. of Germany . |
| 1474973 | 8/1970 | Fed. Rep. of Germany . |
| 2209515 | 2/1975 | Fed. Rep. of Germany . |
| 2804136 | 3/1979 | Fed. Rep. of Germany . |
| 2754370 | 6/1979 | Fed. Rep. of Germany ...... 271/194 |

(List continued on next page.)

OTHER PUBLICATIONS

Patent Abstracts of Japan, E-83 Nov. 20, 1981, vol. 5, No. 181, Umezawa, "Sheet Retaining Device".
Patent Abstracts of Japan, E-268 Sep. 22, 1984, vol. 8, No. 209, Houjiyou, "Sheet Holder".

*Primary Examiner*—Benjamin R. Fuller
*Assistant Examiner*—John Barlow
*Attorney, Agent, or Firm*—Hill, Steadman & Simpson

[57] ABSTRACT

The invention is directed to a device for automatically clamping and releasing film material onto or, respectively, from the recording drum of a reproduction device with vacuum suctioning. The device is composed of a roll film cassette, of a conveying and guide surface, of a film cutting means, of a film length measuring means, of a pressure means having a pressure roller, of a lift-off means having lift-off finger, as well as drives for turning the recording drum and for conveying the film material to the recording drum. The recording drum comprises axially proceeding suction hole rows for suctioning the film material by vacuum. A vacuum distributor controllable by the rotational motion is arranged in the recording drum, this vacuum distributor successively connecting the individual suction hole rows to the stationary vacuum pump during clamping, so that the suction hole rows are charged with vacuum step-by-step with increasing wrap of the recording drum by the film material. Film material of different formats, particularly large formats, can be automatically clamped without the formation of folds and warping with the device and can be reliably fixed on the recording drum during the exposure.

27 Claims, 13 Drawing Sheets

U.S. PATENT DOCUMENTS

| | | |
|---|---|---|
| 4,298,276 | 11/1981 | Tsuda et al. ............................ 355/72 |
| 4,527,320 | 7/1985 | Deconinck ............................ 29/33 R |
| 4,605,300 | 8/1986 | Thaddey ................................ 355/29 |
| 4,660,825 | 4/1987 | Umezawa et al. ................... 271/276 |
| 4,660,964 | 4/1987 | Yoshikawa et al. ................... 355/28 |
| 4,733,309 | 3/1988 | Mori et al. ........................... 358/289 |
| 4,786,946 | 11/1988 | Jessop ................................... 355/28 |
| 4,928,897 | 5/1990 | Satou et al. ............................ 355/72 |

FOREIGN PATENT DOCUMENTS

| | | |
|---|---|---|
| 3120172A1 | 12/1982 | Fed. Rep. of Germany . |
| 3230676A2 | 3/1983 | Fed. Rep. of Germany . |
| 3303476A1 | 8/1984 | Fed. Rep. of Germany . |
| 3615703A1 | 11/1987 | Fed. Rep. of Germany . |
| 3744002A1 | 7/1989 | Fed. Rep. of Germany . |
| 61-170179 | 7/1986 | Japan . |
| 1158116 | 7/1969 | United Kingdom . |
| 2183605 | 6/1987 | United Kingdom . |

DEVICE FOR AUTOMATICALLY CLAMPING AND RELEASING RECORDING MATERIAL AND OPERATION OF SAID DEVICE

BACKGROUND OF THE INVENTION

The invention is in the field of electronic reproduction technology and is directed to a device and to the operation thereof for automatically clamping film material onto the recording drum of a reproduction device, for the vacuum control of the recording drum and for releasing the film material exposed by a recording element from the recording drum. In particular, the reproduction apparatus is a color scanner or color recorder.

In reproduction technology, color separations for multi-color printing are produced with color scanners or color recorders. For that purpose, color signals are first acquired by optoelectronic, trichromatic scanning of a chromatic original and these color signals are converted into color separation signals by a color correction. Sheet-shaped film materials, also referred to as film proofs or film sheets are clamped on a recording drum of the color scanner or color recorder and are exposed point-by-point and line-by-line by a recording element that is modulated in brightness by the color separation signals. The exposed film proofs are released from the recording drum and are developed. The developed film proofs are the color separations for the multi-color printing.

The film proofs to be exposed and having different formats can already be present in the form of sheet film material that is taken from a sheet film cassette for clamping or that is cut-off from roll film material situated in a roll film cassette before the clamping.

In traditional color scanners or color recorders, the film proofs to be exposed are manually clamped onto the recording drum and are fixed thereat either with adhesive tape or with a vacuum suction.

It is required for an effective and economical use of a color scanner or color recorder to enhance the efficiency particularly by shortening the preparation and adjustment times at the color scanner as compared to the times required for the actual film exposure. The preparation and adjustment times, for example, can be reduced in that the optimum adjustment parameters for a good reproduction are calculated by an operator in a prior process on the basis of work preparation devices (AV devices) and are stored and are then transferred into the color scanner in a short time immediately before the film exposure. At the same time, as many work steps as possible that are to be normally executed by the operator must be automated, for example the clamping and releasing of the film proofs onto or, respectively, from the recording drum.

Added thereto is the desire to be able to expose film proofs having different formats, particularly large-format film proofs, for, for example, reproduction of posters.

DE-B-22 09 515 already discloses an electronic reproduction device having a means for clamping sheet-shaped recording material onto a recording drum with vacuum suctioning and for releasing the exposed recording material.

The film proofs to be exposed, which are situated in a sheet film cassette, have their registration perforations hooked over registration pins situated on the recording drum with a manually actuatable roller and lever mechanism in the known reproduction device. The vacuum pump is then switched on and the recording drum is turned, as a result whereof the film proofs are pulled from the sheet film cassette, are wound around the rotating recording drum and are fixed on the drum surface by the vacuum. After the exposure, the film proofs are released and are in turn conveyed back into the roll film cassette by the roller and lever mechanism.

The recording drum is a hollow cylinder that is closed by covers. Shaft journals with which the recording drum is rotatably seated at the device carrier of the reproduction device are secured to the covers. The wall of the hollow cylinder is provided with suction holes for suctioning the film proofs against the drum surface. The suction holes are in communication with the interior of the drum. One shaft journal is hollow, a suction channel arising as a result thereof which connects the drum interior to a stationary vacuum pump via a rotary transmission leadthrough secured to the shaft journal and via a stationary suction line.

The device known from DE-B-22 09 515 has the disadvantage that only film proofs provided with registration perforations and having given formats can be clamped and that the clamping and release can only occur with the collaboration of the operator.

U.S. Pat. No. 4,268,841 discloses an electronic reproduction device that already comprises an apparatus for automatically clamping sheet-shaped recording material onto a recording drum, for vacuum suctioning of the recording material against the recording drum and for the automatic release of the exposed recording material from the recording drum. The sheet-shaped recording material is automatically conveyed from a supply station via a conveyor means to the recording drum, is wound around the recording drum with the assistance of an annular channel between drum surface and housing 1 and is fixed thereat by vacuum suctioning. After the exposure, the recording material is likewise automatically released from the recording drum and is supplied to an exit opening in the device for further-processing. The generated surface of the recording drum is provided with suction holes arranged in a rotational direction that are connected to a stationary vacuum pump via the interior of the recording drum and via a suction line in the shaft. A vacuum control means with which the vacuum for the suction holes is switched on and off or can be set to an intermediate value is situated in the suction line.

The device disclosed by U.S. Pat. No. 4,268,841 has the disadvantage that only sheet-shaped recording material can be clamped and released and that no special measures are recited for the reliable, fold-free clamping of recording material of different formats which guarantee a friction-free, automatic execution.

Both known apparatus have the further advantage that all suction holes of the recording drum are simultaneously charged with vacuum when the vacuum pump is switched on at the beginning of the clamping process. High vacuum losses arise as a result thereof, particularly given small-format film proofs, since only a small number of suction holes are covered by the film proof. A reliable clamping of the film proofs during the exposure time wherein the recording drum rotates at high speed is then not assured as a consequence of the high vacuum losses. The suction effect and, thus, the fixing of the film proofs can in fact be improved by installing a vacuum pump having a higher nominal output; this, however, would be costly.

It is already known for reducing the vacuum losses to seal the suction holes that are not respectively covered by the film proof clamped on at the moment with adhesive strips or to employ a recording drum wherein the non-covered suction holes are automatically closed with valves. The sealing of the suction holes with adhesive strips is time-consuming and sealing them by automatically operating valves is involved and unreliable.

It is likewise already known to subdivide the recording drum into individually connectable vacuum chambers with transverse walls. In this case, a reduction in the vacuum losses can be achieved in that only those vacuum chambers are respectively activated that momentarily participate in the fixing of the film proofs based on the axial format length.

DE-A-32 30 676 already discloses a vacuum clamping means that uses a combination of pneumatic and mechanical components for fixing sheet-shaped recording material on a recording drum. The suction holes of the recording drum are combined into at least two groups, each of these encompassing one or more rows of suction holes connected to one another. The individual suction hole groups are in communication with one another via lines that can be disconnected with valves. At least one group is connected to a stationary vacuum generator. What is achieved by adding individual suction hole groups or suction hole rows is that recording material of various formats can be clamped without high vacuum losses. Means for controlling the valves and for conveying the recording material to or from the recording drum are not recited.

The apparatus disclosed by DE-A-32 30 676 thus has the disadvantage that the feed of the sheet-shaped recording material must ensue manually and that the switching of the suction hole groups or suction hole rows does not ensue automatically dependent on the clamping and release event and/or on the respective format of the recording material to be clamped on.

The tendency in reproduction technology is toward the employment of unperforated roll film material and to cut off the respectively required film lengths from the roll film material and to clamp it. Added thereto is the desire to be able to clamp and release arbitrary formats. Practice has shown that it is difficult to clamp, in particular, large-format film proofs on the recording drum exactly and fold-free. The exact and smooth clamping of the film proofs, however, is an indispensable prerequisite for the exposure of exactly registered color separations and for the production of qualitatively high-grade multi-color prints.

SUMMARY OF THE INVENTION

The object of the invention is therefore to specify a device and the operation thereof for automatically clamping and releasing unperforated recording material having different formats onto or, respectively, from the recording drum of a reproduction device and for the automatic fixing of the recording material on the recording drum with vacuum suctioning which guarantees a reliable and smooth clamping, a reliable fixing given economical vacuum generation and a reliable release of the recording material, so that a friction-free work execution and a high production quality is achieved.

According to the invention, an apparatus and method are provided for automatically clamping film onto a recording drum of a reproduction device and for removing the film exposed by the recording element from the recording drum. The recording drum is arranged in a light-tight space of the reproduction device. A generated surface of the recording drum has means for vacuum-fixing of the film material comprising suction holes. The suction holes are arranged in suction hole rows proceeding substantially parallel relative to an axis of the drum. The suction hole rows are connected to a stationary vacuum pump. A roll film cassette that contains a web of the film as a rotatable film roll is provided. A slot-shaped film passage opening which closes light-tight is provided in the cassette. The roll film cassette is receivable into the light-tight space of the reproduction device. Means are provided for locking it there. The film passage opening is aligned toward the recording drum and has a longitudinal extend proceeding substantially parallel to the drum axis. A conveying and guide surface is arranged between the film passage opening of the roll film cassette and the recording drum for receiving the film web unwound from the film roll and for guiding it substantially tangentially relative to the recording drum in a region of the recording drum. A film conveying means for conveying the film web out of the film roll cassette into the recording drum is provided. A film cutting means is arranged between the roll film cassette and the recording drum for cutting from the film web a film sheet of a prescribed length to be respectively exposed. A film length measuring means is arranged between the roll film cassette and the recording drum for identifying a length of the film web that has respectively passed through. Pressure means is provided comprising a pressure roller that is pivotable against the recording drum in a region where a start of the film web conveyed via the conveyor and guide surface means to the recording drum comes into contact with the drum surface. A positioning drive means for turning the recording drum to start of clamping, start of exposure, and start of release positions is provided. A lift-off means comprising a lift-off finger which is pivotable against the recording drum for peeling a respectively exposed sheet of film from the recording drum is provided. Suction channels proceed substantially parallel relative to the drum axis in the recording drum, each of the suction channels connecting the suction holes of a suction hole row to one another. A vacuum distributor means is provided which is controllable by rotational movement of the recording drum for connecting the individual suction channels to the stationary vacuum pump via a suction line such that during clamping, a suction hole row on which a starting region of the film sheet lies is first charged with vacuum. Further suction hole rows are then successively added and charged with vacuum in accordance with increasing wrap of the turning recording drum by the film sheet. The addition of further suction hole rows occurs in accordance with a respective circumferential length of the film sheet to be clamped on.

The invention shall be set forth in greater detail below with reference to FIGS. 1 through 17.

DESCRIPTION OF THE PREFERRED EMBODIMENTS

Figure 1:
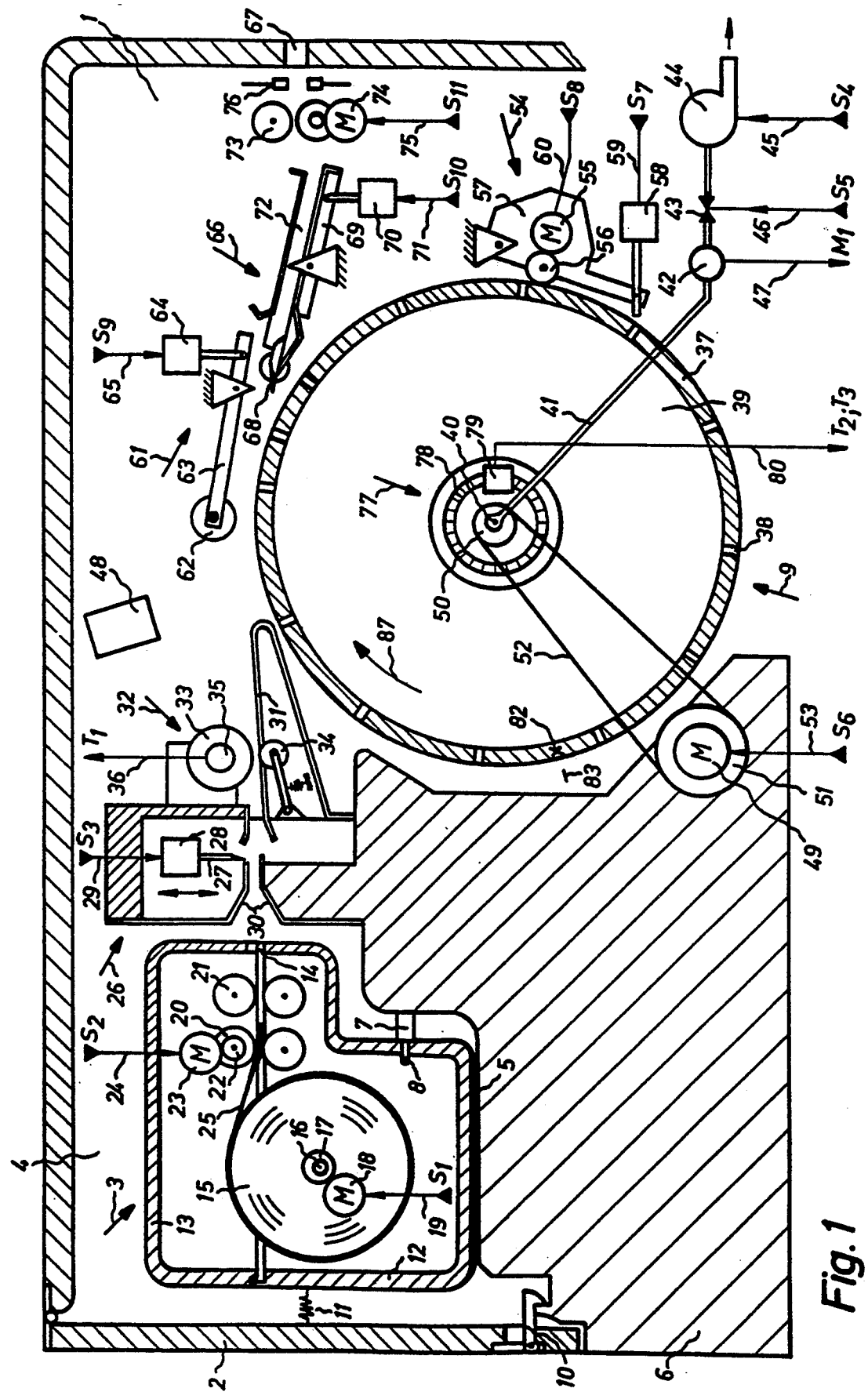
FIG. 1 illustrates the fundamental structure of a device for automatically clamping and releasing recording material onto or, respectively, from the recording drum of a color recorder shown in section.

As a sectional view, FIG. 1 shows the fundamental structure of a device for automatically clamping and releasing recording material onto or, respectively, from the recording drum of a color scanner, the recording drum, the dark room for the exposure and a part of the device carrier.

At its left-hand side, the darkroom 1 of the color scanner comprises a loading flap 2 that closes light-tight. A roll film cassette 3 as feeder cassette is inserted through the opened loading flap 2 into a cassette insertion compartment 4 of the color recorder and is deposited on an elevating platform 5 of the device carrier 6. With the assistance of centering pins 7 secured in the device carrier 6 and of corresponding centering bores 8 in the wall of the roll film cassette 3, the latter is exactly aligned vis-a-vis the device carrier 6 and vis-a-vis a recording drum 9 of the color recorder. After the loading flap 2 is closed and locked with the interlock 10, the roll film cassette 3 is pressed against the centering pins 7 by springs 11 and is fixed in the cassette insertion compartment 4. The roll film cassette 3, which is composed of a lower part 12 and of a removable cover 13 that closes light-tight, comprises a slot-shaped film passage opening 14.

Outside of the color scanner, the roll film cassette 3 was equipped with a film roll 15 of a given width through the opened cover 13 in that the hollow core of the film roll 15 was secured on a shaft 16 seated inside the roll film cassette 3. One end of the shaft 16 is conducted toward the outside through a bore in the wall of the roll film cassette 3 and is provided thereat with a drive wheel 17. After the roll film cassette 3 has been introduced into the cassette introduction compartment 4, the drive wheel 17 is coupled to a winding motor 18 that is stationarily secured to the device carrier 6 and that is controlled by a control signal $S_1$ on a line 19. A pair of film conveying rollers 20 and a pair of sealing rollers 21 are situated inside the roll film cassette 3 at the height of the film passage opening 14, respectively one roller thereof being rotatably seated at the wall of the cover 13 and the other roller thereof being rotatably seated at the wall of the lower part 12. The shaft end of a roller of the pair of film conveying rollers 20 is conducted out of the roll film cassette 3 and is provided with a drive wheel 22 that is coupled to a stationary film conveying motor 23 when the roll film cassette 3 is introduced. The film conveying motor 23 is controllable with a control signal $S_2$ on a line 24. The pair of sealing rollers 21 seals the interior of the cassette from the film passage opening 14 in terms of light. The length of the pair of film conveying rollers 20, of the pair of sealing rollers 21 and of the film passage opening 14 corresponds to the maximally possible width of the film roll 15 that is in turn based on the structural length of the recording drum 9.

When equipping the roll film cassette 3, the start of the film roll 15 was threaded into the pair of film conveying rollers 20. The winding motor 18 additionally works as an electrical spring in that it generates a small counter-torque with respect to the torque of the film conveying motor 23 on the basis of permanent excitation, so that the film web 25 is always slightly tensed between the pair of film conveyor rollers 20 and the film roll 15.

The clamping and releasing device also comprises a film cutting means 26 having a cutter blade 27 that is arranged in front of the film passage opening 14 of the roll film cassette 3 and is secured to the device carrier 6. The cutter blade 27 is actuated by a suitable adjustment element 28 that is controlled by a control signal $S_3$ on a line 29. The cutter blade 27 can be executed as a fly cutter that is lowered by the control element 28 or as a circular knife that is guided perpendicular to the film web 25 by the control element 28 and cuts the film web 25 across its width. The film web 25 is conveyed through the film cutting means 26 with the assistance of guide surfaces 30 and 31. The film cutting means 26 has the job of separating the film proof of a given length that is to be respectively clamped at the moment and exposed from the film web 25.

A film length measuring means 32 is provided following the film cutting means 26, the length of the film web 25 passing through being measured therewith. The film length measuring means 32 is composed of a measuring wheel 33, of a resiliently seated support wheel 34 and of a rotational pulse generator 35 coupled to the measuring wheel 33. The supporting wheel 34 projects through an opening in the guide surface 31 and presses the film web 25 against the measuring wheel 33 when it passes through. When the film web 25 is conveyed through the film length measuring means 32, the measuring wheel 33 executes a rotational motion that is transmitted onto the rotational pulse generator 35. The rotational pulse generator 35 generates a measurement clock sequence $T_1$ on a line 36 whose number of clocks is a measure for the length of the film web 25 that has passed through.

The recording drum 9 is a hollow cylinder 37 whose end faces are closed. Shaft ends with which the recording drum 9 is rotatably seated at the device carrier 6 are secured to the end faces, this no longer being shown in detail in FIG. 1. The wall of the hollow cylinder 37 is provided with suction holes 38 that are connected to a vacuum distributor (not visible). One of the shaft ends is hollow, a vacuum channel arising as a result thereof that connects the vacuum distributor to a stationary suction line 41 via a vacuum connector 40 situated at the shaft end. The suction line 41 is connected to a vacuum pump 44 via a vacuum gauge 42 and via a controllable secondary air valve 43. The vacuum pump 44 is switched on and off via a control signal $S_4$ on a line 45. A further control signal $S_5$ on a line 46 actuates the secondary air valve 43. The measured vacuum value is output by the vacuum gauge 42 via a line 47 as measured signal $M_1$.

The suction holes 38 are aligned in rows proceeding axially relative to the recording drum 9. The circumferential spacings of the suction hole rolls are expediently adapted to the standard format lengths of the film proofs to be clamped, i.e. the spacings of the suction hole rows are selected such that starts and ends of the film proofs of different formats respectively lie in the region of a suction hole row. The exact structure of the recording drum and of the vacuum distributor as well as the operation thereof shall be set forth in greater detail in FIGS. 8 through 17.

During the exposure of the clamped film proofs by a recording element 48, the recording drum 9 is driven by a main motor 49 via a belt drive that is composed of a pulley 50 connected to the recording drum 9, of a pulley 51 connected to the main motor 4 and of a belt 52. The main motor 49 is controlled by a control signal $S_6$ on a line 53.

A pivotable positioning drive 54 is present for positioning the recording drum 9 during the clamping and release of the film proofs. The positioning drive 54 is composed of an auxiliary motor 55 and of a frictional wheel 56 driven by the auxiliary motor 55. The auxiliary motor 55 and the frictional wheel 56 are mounted on a rotatably seated carrier plate 57 that can be positioned by a control element 58 such that the frictional wheel 56 either presses against the drum surface—as shown in FIG. 1—or is swivelled away therefrom. The control element 58 is actuated by a control signal $S_7$ on a line 59. The auxiliary motor 55 can be switched on and off by a further control signal $S_8$ on a line 60.

A pivotable pressure means 61 is provided for pressing the film proofs against the recording drum 9, this pressure means 61 being arranged in the region wherein the start of the film proof to be clamped respectively touches the drum surface. The pressure means 61 is composed of a pressure roller 62 that is rotatably seated at a lever 63 pivotable around a stationary pivot point and of a control element 64. The control element 64 that is activated by a control signal $S_9$ on a line 65 pivots the lever 63 such that the pressure roller 62 either presses against the drum surface or assumes the illustrated quiescent position.

For lifting the exposed film proofs off from the recording drum 9, a lift-off means 66 that is likewise pivotable is provided, this being arranged in the region of the darkroom 1 wherein the exposed film proofs are transported out of the darkroom 1 through a slot-shaped film exit opening 67. The lift-off means 66 comprises a lift-off finger 68 that is secured to a lever 69 pivotable around a stationary pivot point. The lever 69 can be pivoted such with a further control element 70 that the lift-off finger 68 enters into a circumferential groove (not visible) in the recording drum 9. The control element 70 is actuated by a control signal $S_{10}$ on a line 71.

The lift-off means 66 further comprises a guide channel 72 with which the exposed film proofs that have been lifted off from the recording drum 9 with the lift-off finger 68 are guided to a pair of conveyor rollers 73 in the region of the film exit opening 67. The pair of conveyor rollers 73 that conveys the film proofs out of the darkroom 1 is driven by a conveyor motor 74 that is switched on and off by a control signal $S_{11}$ on a line 75.

Either a sleeve film cassette or the conveying channel of an external film developing station can be connected light-tight to the film exit opening 67 in order to collect the exposed film proofs conveyed through the film exit opening 67 or to immediately further-process them.

A light barrier 76 is arranged in the darkroom 1 preceding the film exit opening 67, the conveying of the exposed film proofs from the darkroom 1 being monitored with the assistance of this light barrier 76, the drive of the conveyor channel of the external developing station being potentially started therewith and the clamping of the next film proof being therewith enabled.

Before the clamping, the exposure and the release of the film proofs, the recording drum 9 must be turned into a defined circumferential position with the positioning drive 54. Such defined circumferential positions are the start of clamping position, the start of exposure position and the start of release position that shall be defined in greater detail in conjunction with the description of the function of the device with reference to FIGS. 2 through 7, and is also a reference position of the recording drum 9.

A position transmitter 77 that, for example, is composed of a grid disc 78 and of a stationary optoelectronic scanner 79 is provided for identifying the respective circumferential position of the recording drum 9. The scanner 79 generates the circumferential pulse $T_2$ on a line 80 per revolution of the recording drum 9 by scanning the grid disc 78 and generates a continuous count clock sequence $T_3$ whose number of clocks is a measure for the respective circumferential position of the recording drum 9.

In the reference position of the recording drum 9, a reference mark 82 secured to the recording drum 9 is coincident with a stationary reference mark 83. The grid disc 78 is adjusted such that the circumferential pulse $T_2$ is respectively output when the recording drum 9 is situated in the reference position.

The circumferential pulse $T_2$ and the counting clock sequence $T_3$ on the line 80 as well as the measuring clock sequence $T_1$ on the line 36 and the measured signal $M_1$ on the line 47 are supplied to a control circuit (not shown) wherein all control signals $S_1$ through $S_{11}$ are generated.

For defining the start of clamping position, the start of exposure position and the start of release position, the control circuit contains a plurality of sequence $T_3$ is counted and that are reset by the position counters into which the counting clock circumferential pulse $T_2$, so that the momentarily counted number of clocks during a revolution indicates the momentary circumferential position of the recording drum proceeding from the reference position.

The control circuit also contains a plurality of position memory registers into which the number of clocks corresponding to the start of clamping position, to the start of exposure position and to the start of release position are input and stored. The stored number of clocks and the number of clocks counted into the position counters are continuously compared to one another and appropriate signals that signalize when the respective circumferential positions are reached are generated given equality.

The control circuit further contains a plurality of length counters into which the measuring clock sequence $T_1$ are counted by the film length measuring means 32 and contains corresponding length memory registers wherein prescribed lengths are stored as numbers of clocks.

These stored numbers of clocks are in turn compared to the counted number of clocks of the measuring clock sequence $T_1$ in order to signal that the prescribed length has been reached.

The prescribed lengths are the respective length $L_1$ of the film proof to be cut off from the film web 25, the device-conditioned, constant spacing $L_2$ of the cutting point under the cutter blade 27 of the cutting means 26 from the measuring point under the measuring wheel 33 of the film length measuring means 32 in the plane of the film web, the distance $L_3$—likewise constant—from the measuring point to a clamping mark on the recording drum 9 when this is situated in the clamping position, as well as the length $L_4$ of a film loop to be formed.

The structure of the device having been set forth with reference to FIG. 1, the operation of the device in the individual phases of clamping and releasing the film proofs shall now be set forth in greater detail with reference to FIGS. 2 through 7.

Figure 2:
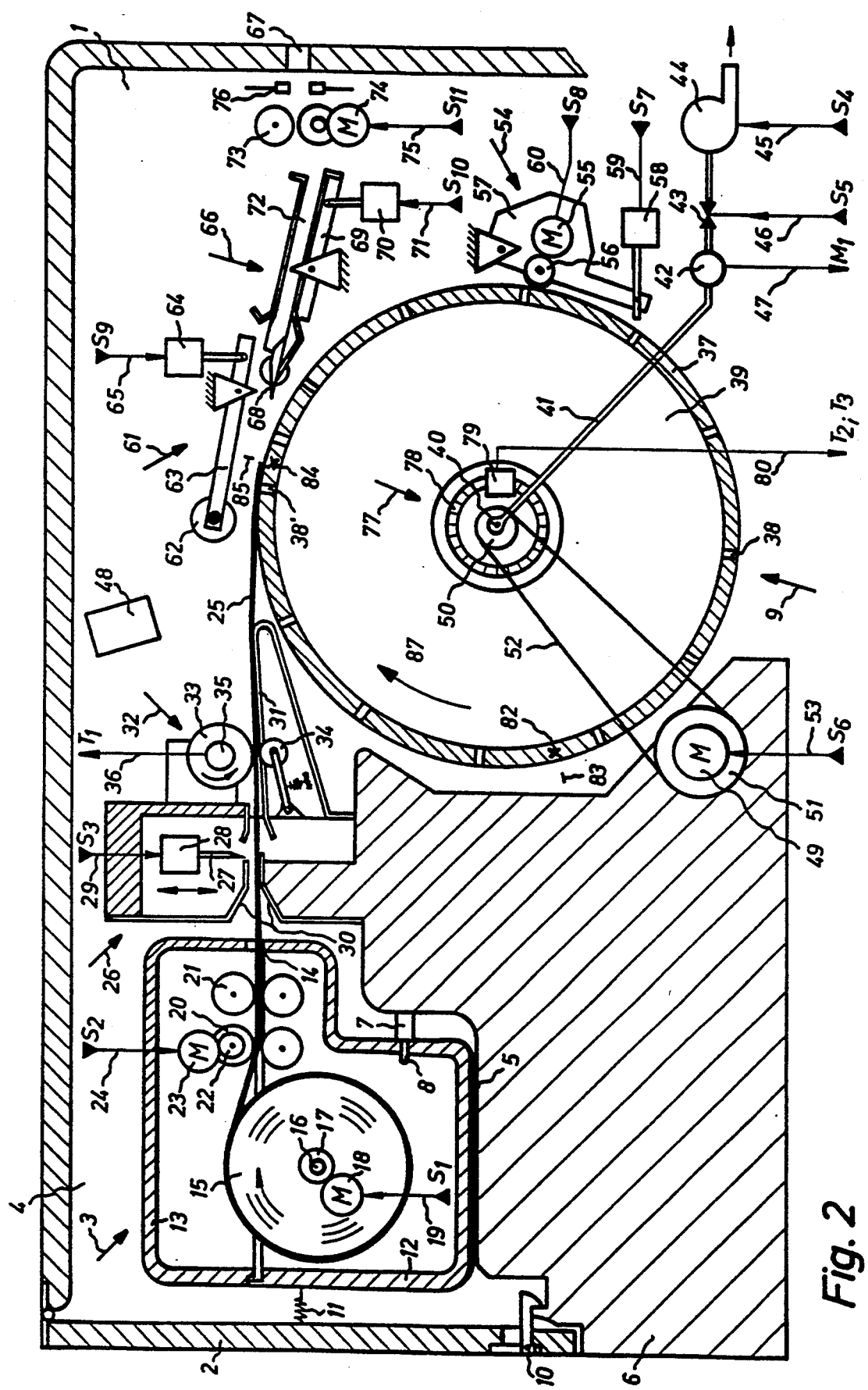
FIG. 2 shows the operation of the device at the beginning of the clamping process, whereby the recording drum is situated in a start of clamping position.

FIG. 2 shows the operation of the device at the beginning of the clamping process, whereby the recording drum 9 is situated in a start of clamping position.

After the length $L_1$ of the film proof to be momentarily cut from the film web 25 or to be momentarily exposed has been input into the corresponding length memory register of the control circuit, the recording drum 9 is first turned into the start of clamping position with the assistance of the positioning drive 54 and the film web 25 is conveyed up to a clamping mark 84 of the recording drum 9. The clamping mark 84 marks that generated line of the recording drum 9 on which the start of the film web 25 conveyed to the recording drum 9 should respectively lie. This clamping mark 84 is expediently applied in the proximity of a suction hole row 38′, so that the starting region of the film web 25 respectively lies over the suction hole row 38′ and is suctioned against the drum surface.

In the start of clamping position of the recording drum 9, the clamping mark 84 is in coincidence with an imaginary, stationary reference mark 85. The start of clamping position is selected such that the clamping mark 84 lies in the region of the pressure roller 62 wherein the start of the film web 25 guided by the guide surface 31 to the recording drum 9 comes into contact with the drum surface.

In order to turn the recording drum 9 into this start of clamping position, the auxiliary motor 55 is started by the control signal $S_8$ on the line 60, the circumferential position is identified with the position transmitter 77, and the auxiliary motor 55 is in turn stopped when the start of clamping position is reached. The frictional wheel 56 of the positioning drive 55 remains swivelled in, in order to retain the recording drum 9 in the start of clamping position.

Subsequently, the film conveying motor 23 is switched on by the control signal $S_2$ on the line 24 and the film web 25 is conveyed via the guide surface 31 to the recording drum 9, being conveyed with the pair of film conveying rollers 22 through the pair of sealing rollers 21, the film cutting means 26 and the film length measuring means 32. When the start of the film web 25 enters into the film length measuring means 32, the latter begins to measure the film length that has run through. When the measured length of the film web 25 is equal to the constant spacing $L_3$ between measuring point and clamping mark 84 on the recording drum 9, the film conveying motor 23 is stopped. As shown in FIG. 2, the start of the film web 25 is then situated at the clamping mark 84 and the starting region of the film web 25 is situated over the suction hole row 38′.

Figure 3:
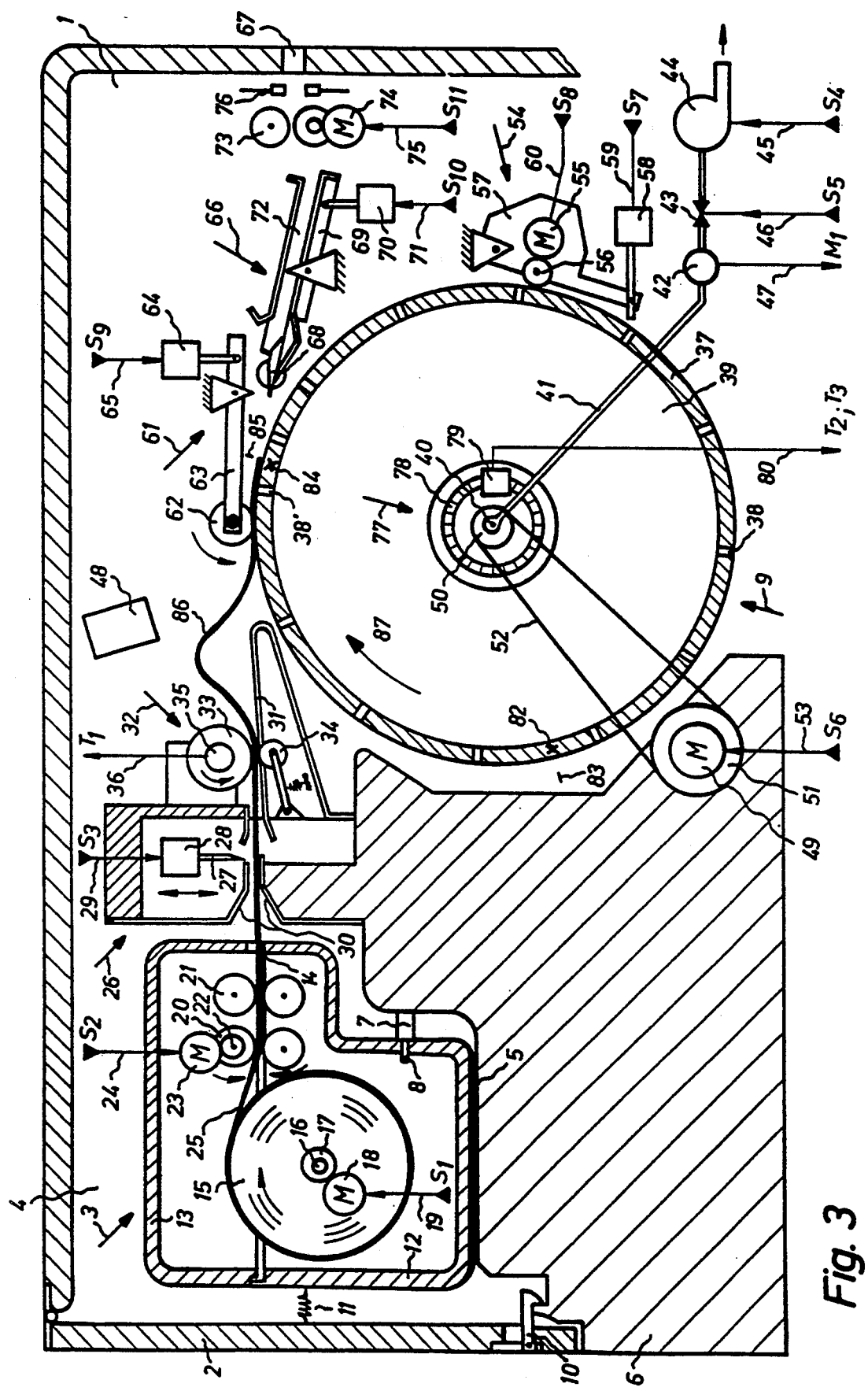
FIG. 3 illustrates the operation of the device during the clamping process at time at which a film loop is formed.

FIG. 3 shows the operation of the device in the clamping process at the time at which a film loop is formed.

After the conveying of the film web 25 to the clamping mark 84, the pressure roller 62 of the pressure means 61 is lowered by the control signal $S_9$ on the line 65, as a result whereof the starting region of the film web 25 is pressed against the drum surface. The vacuum is now built up by switching on the vacuum pump 44 with the control signal $S_4$ on the line 45 and the starting region of the film web 25 is fixed on the drum surface by the vacuum. The secondary air valve 43 is thereby closed, so that the vacuum takes effect with its full nominal value. Reaching the full nominal value is checked with the assistance of the vacuum gauge 44 in that the measured signal $M_1$ on the line 47 is compared to a rated nominal value in the control circuit.

If it should turn out when measuring the vacuum that the nominal vacuum value was not reached, the prior execution is reversed in that the pressure roller 62 is lifted off, the vacuum is shut off and the film web 25 is conveyed back into the roll film cassette 3 with the assistance of the film conveying motor 23 until the start of the film web 25 has reached the position between the pair of film conveying rollers 22 shown in FIG. 1. When rewinding the film web 25 into the roll film cassette 3, the winding motor 18 is simultaneously started by the control signal $S_1$ on the line 19, this winding motor 18 in turn rewinding the returned film web 25 onto the film roll 15.

When it has found when checking the vacuum that the full nominal value of the vacuum has been reached, a film loop 86 begins to form in the film web 25 in that the film conveying motor 23 is re-started and another section of the film web 25 is conveyed out of the roll film cassette 3. Since the vacuum and the pressure roller 62 retain the start of the film web 25 on the recording drum 9 stopped in the start of clamping position, the film web 25 backs up and forms the film loop 86. The length of the film web 25 conveyed during the formation of the loop is measured by the film length measuring means 32 and the film conveying motor 23 is in turn stopped when the measured length coincides with the length $L_4$ of the film loop 86 previously input into the control circuit. At this point in time, the film length measuring means 32 has measured a film length of $L_3+L_4$.

After the formation of the film loop 86, the secondary air valve 43 is opened by the control signal $S_5$ on the line 46 and the vacuum is lowered to a reduced value. The reduced vacuum is also measured with the vacuum gauge 42 and is compared to a reduced, rated nominal value. If it turns out that the reduced vacuum was not reached, the prior execution—as already set forth—is likewise reversed and the film web 25 is conveyed back into the roll film cassette 3.

Figure 4:
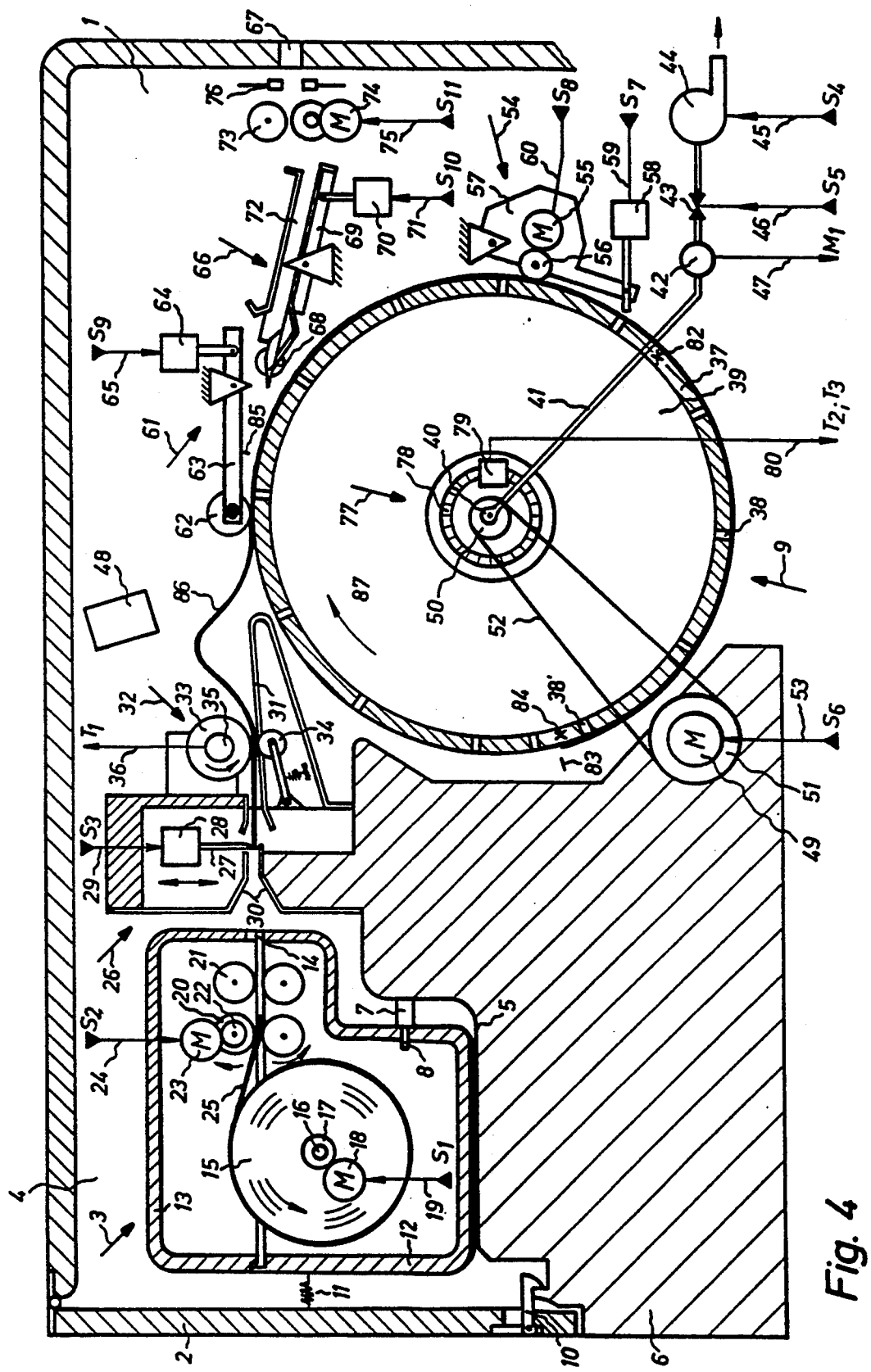
FIG. 4 shows the operation of the device during the clamping process after cutting a film proof from a film web.

When the reduced, rated nominal value for the vacuum has been reached, the process of clamping the film web 25 or, respectively, the film proof 25' onto the recording drum 9 begins after the cutting event, as shown in FIG. 4.

The auxiliary motor 55 of the positioning drive 54 is started by the control signal $S_8$ on the line 60 and the film conveying motor 23 is started by the control signal $S_2$ on the line 24. By turning the recording drum 9 in the direction of an arrow 87, the film web 25 places itself around the recording drum 9, whereby that part of the film web 25 corresponding to the respective wrap is fixed on the drum surface by the suction hole rows. The rotational speed of the recording drum 9 and the conveying speed of the film web 25 are matched such to one another that the size of the film loop 86 is approximately maintained during clamping.

During clamping, the film conveying motor 23 continues to feed the film web 25 until the film length measuring means 32 has identified an overall film length passing through that corresponds to the previously input length $L_1$ of the film proof to be clamped minus the constant spacing $L_4$ between cutting point and measuring point. At this time, the end of the film proof 25' to be cut off from the film web 25 is situated in the cutting point under the cutter blade 27 of the film cutting means 26. The film conveying motor 23 and the auxiliary motor 55 of the positioning drive 54 are stopped and the film proof 25' is cut off from the film web 25 by the cutter blade 27 on the basis of the control instruction $S_3$ on the line 29.

FIG. 4 shows the operation of the device during the clamping process after the film proof 25' has been cut off from the film web 25.

After the film cut, the film conveying motor 23 runs in the opposite rotational sense and conveys the film web 25 back into the roll film cassette 3 until the cut edge lies between the pair of film conveying rollers 22, the film web 25 having thus been prepared for another clamping process.

After the film cut, the auxiliary motor 55 of the positioning drive 54 is also restarted and the recording drum 9 continues to turn in the direction of the arrow 87 until the entire film proof 25' is clamped, whereby the clamped film proof 25' is fixed on the drum surface by the reduced vacuum.

The film loop 86 achieves a decoupling of the film conveying from the rotational motion of the recording drum. Drunkenness of the roll film cassette, crooked clamping of the film proof 25' on the recording drum 9 as well as warping and the formation of folds within the film proof 25' being advantageously prevented as a result thereof. Added thereto is that the starting region of the film proof 25' is stiffened by the film loop 86, so that a reliable fixing of the starting region is guaranteed. As a result of reducing the vacuum during the clamping, the tendency of the film proof to form folds and to run at a slant is further reduced and a tension-free clamping is guaranteed.

Figure 5:
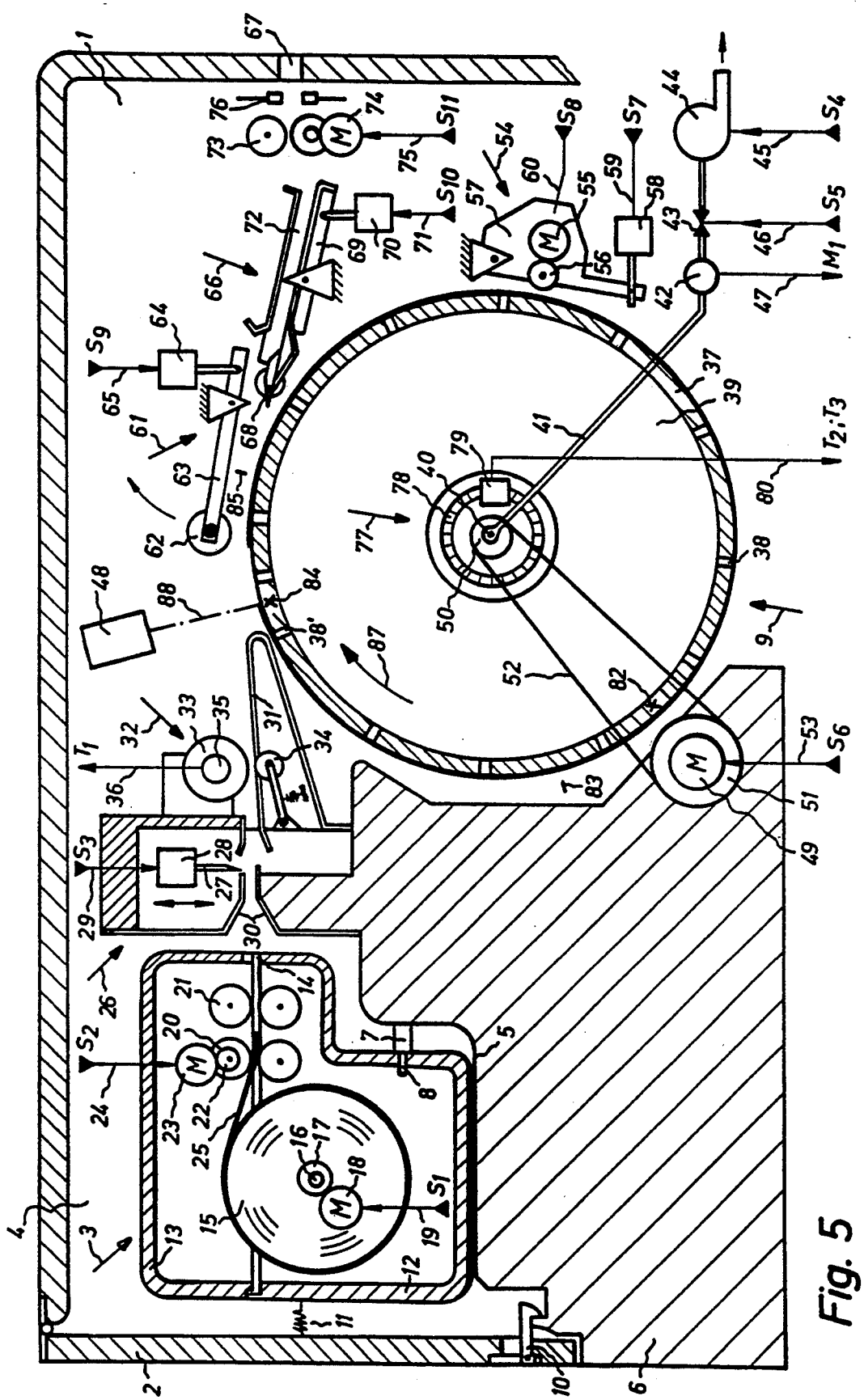
FIG. 5 illustrates the operation of the device during the clamping process during the fixing of the cut-off film proof on the recording drum.

FIG. 5 shows the operation of the device in the clamping process while the cut-off film proof 25' is being fixed on the recording drum 9.

When the recording drum 9 is situated in the start of exposure position, the auxiliary motor 55 of the positioning drive 54 is stopped. In the start of exposure position, the clamping mark 84 at the recording drum 9 is situated in the optical axis 88 of the recording element 48. In the start of exposure position of the recording drum 9, the frictional wheel 56 of the positioning drive 54 and the pressure roller 62 of the pressing means 61 are lifted off from the surface of the recording drum 9 by the control signals $S_8$ and $S_9$ on the lines 60 and 65. At the same time, the vacuum is boosted to the full nominal value by closing the secondary air valve 43 with the control signal $S_5$ on the line 46. When the monitoring of the vacuum with the vacuum gauge 42 shows that the nominal value has in fact been reached, the main motor 49 starts as a result of the control signal $S_6$ on the line 53 and turns the recording drum 9 during the exposure of the clamped film proof 25' by the recording element 48.

Figure 6:
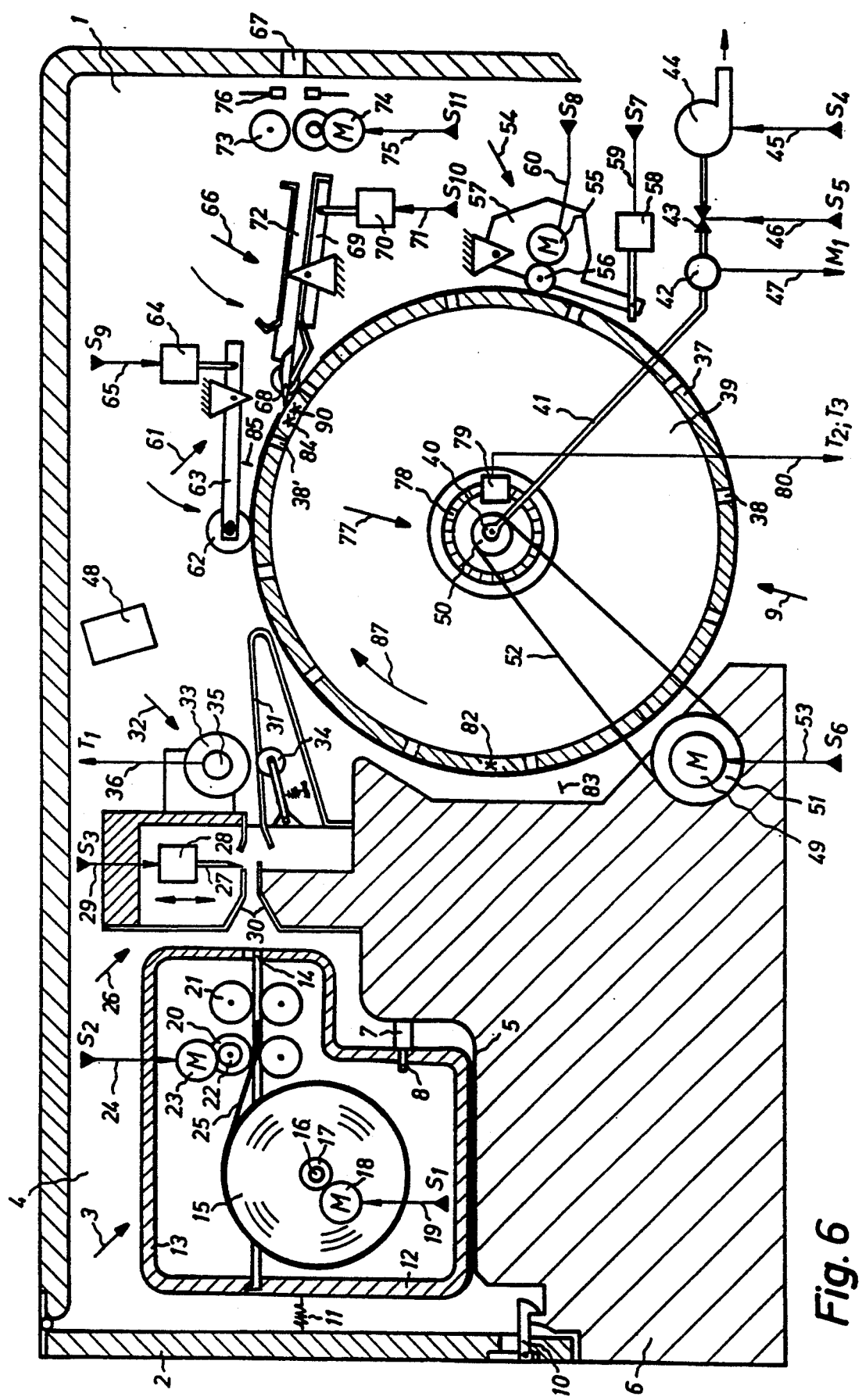
FIG. 6 illustrates the operation of the device at the beginning of the release process, whereby the recording drum is situated in a start of release position.

FIG. 6 shows the operation of the device at the beginning of the release process, whereby the recording drum 9 is situated in a start of release position, The release process is initiated after the exposure of the film proof 25' and deceleration of the recording drum 9.

The frictional wheel 56 of the positioning drive 54 is again lowered onto the surface of the recording drum 9 by the control instruction $S_7$ on the line 59; the auxiliary motor 55 of the positioning drive 54 is switched on by the control signal $S_8$ on the line 60; and the recording drum 9 is turned in the direction of the arrow 87 into the start of release position, A fixed release mark 90 is situated at the recording drum 9 in the start of release position under the tip of the lift-off finger 68 of the lift-off means 66. The release mark 90 lies in that region of the drum surface that dare not be covered by the clamped film proof 25' so that the lift-off finger 68 can reliably enter into the circumferential groove (not shown) of the recording drum 9 between the start and end of the clamped film proof 25'. Deriving therefrom is the demand that the maximally possible length of a film proof 25' to be clamped on must be shorter by the said region than the circumferential length of the recording drum 9. The start of release position is assumed independently of the respective length of the clamped film proof 25'.

In the start of release position, the pressure roller 62 of the pressure means 61 is lowered by the control signal $S_9$ on the line 65 and the lift-off finger 68 of the lift-off means 71 is lowered and the conveyor motor 74 is started by the control signal $S_{11}$ on the line 75 and, as a result thereof, the pair of film conveying rollers 73 is placed in rotation. Subsequently, the auxiliary motor 55 of the positioning drive 54 is again started by the control signal $S_8$ on the line 60 and the recording drum 9 is turned farther in the direction of the arrow 87.

Figure 7:
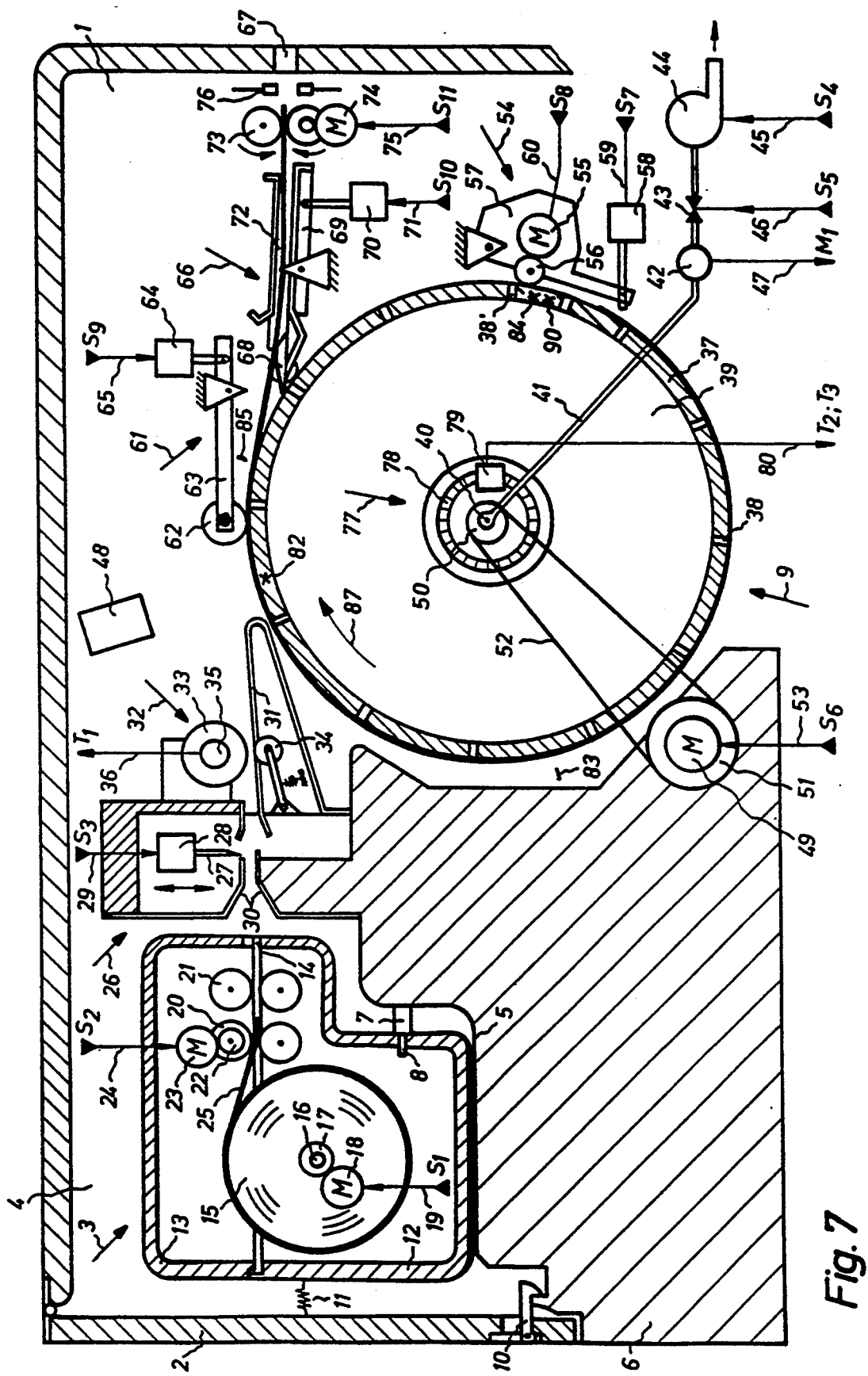
FIG. 7 shows the operation of the device during the release process while the exposed film proof is being peeled from the recording drum.

FIG. 7 shows the operation of the device in the release process while the exposed film proof 25' is being peeled from the recording drum 9.

Due to the rotation of the recording drum 9, the lift-off finger 68 peels the exposed film proof 25' from the drum surface under full vacuum. Due to the rotation of the recording drum 9, the exposed film proof 25' is pushed through the guide channel 72 of the lift-off means 66 until it is seized by the pair of conveyor rollers 73 and is conveyed out of the darkroom 1 through the film exit opening 67.

The conveyor motor 74 is equipped with a freewheel with which a speed matching between the rotational motion of the recording drum 9 and the rotational motion of the pair of film conveying rollers 73 is advantageously undertaken.

The apparatus for clamping and releasing film material and the operation thereof having now been set forth, the structure of the recording drum 9 and of the vacuum distributor as well as the operation thereof shall be set forth in greater detail.

Figure 8:
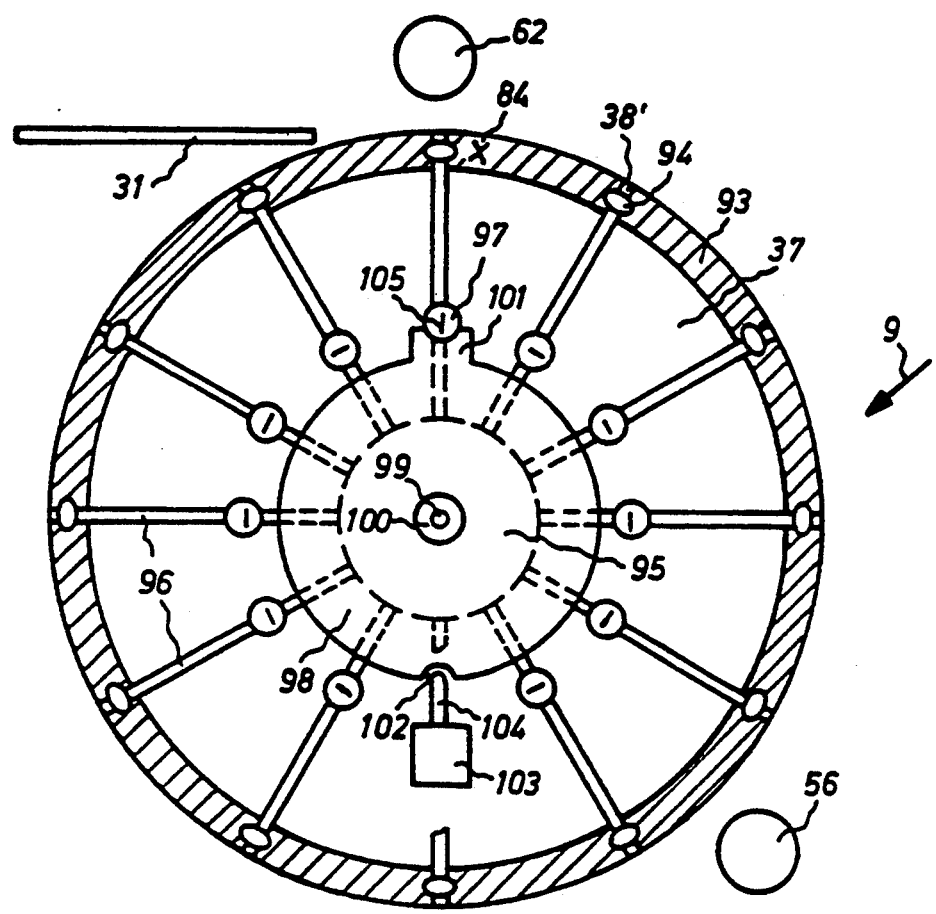
FIG. 8 shows the fundamental structure of the recording drum comprising vacuum distributor for vacuum control.

FIG. 8 shows the fundamental structure of the recording drum 9 with vacuum distributor for vacuum control in cross section. The wall 93 of the recording drum 9 fashioned as a hollow cylinder 37 is provided with the suction holes 38 that are lathed in rows 38' proceeding axially relative to the drum axis. The suction holes 38 of the individual suction hole rows 38' discharge into suction channels 94 that proceed in the wall 93 axially vis-a-vis the drum axis.

The recording drum 9 comprises a vacuum distributor that, when the film proof 25' is being released successively charges the individual suction hole rows 38' dependent on the respective rotational angle of the recording drum 9 or, respectively, dependent on the momentary wrap of the film proof 25' around the recording drum 9 and that respectively adds only as many suction hole rows 38' as devolve onto the momentary circumferential length of the film proof 25' to be clamped.

Due to the step-by-step addition of the suction hole rows 38' according to the respective wrap of the film proofs 25', an exact and fold-free clamping of, in particular, large-format film proofs is achieved and a reliable fixing of the film proofs 25' on the drum surface during the exposure is achieved due to the low vacuum losses.

The vacuum distributor is essentially composed of a vacuum clamp 95, distributor lines 96, valves 97 and of a plate cam 98 for the valves 97.

The cylindrical vacuum chamber 95 that is situated in the interior of the drum is connected to the individual suction channels 94 or, respectively, suction hole rows 35' via the distributor lines 96 that proceed radially vis-a-vis the drum axis. Valves 97 which selectively connect the individual suction channels 94 to the vacuum chamber 95 or disconnect them therefrom are circularly arranged around the drum axis in the distributor lines 96. The vacuum chamber 95 is in communication with the vacuum pump 44 (not shown) via a suction bore 99 in the journal 100.

In the illustrated exemplary embodiment, the valves 97 can be mechanically controlled by the plate cam 98. Alternatively, pneumatic or electrically controllable valves can also, for example, be employed.

The plate cam 98 that comprises a control finger 101 and a groove 102 at its circumference is seated in the journal 100 with a sliding fit. A locking pin 104 that blocks the plate cam 98 in a specific position can be introduced with a stationary control element 103 into the groove 102 of the plate cam 98. By turning the recording drum 9, the valves 97 then move past the control finger 101 of the blocked plate cam 98 that successively opens or closes the valves 97 dependent on the rotational sense of the recording drum 9, whereby the valves 97 remain in the work position they respectively assume.

The respective work position of the valves 97 is indicated by strokes 105, whereby a stroke 105 proceeding in the direction of a distributor line 96 indicates an open valve 97 and a stroke 105 proceeding perpendicularly relative to a distributor line 96 indicates a closed valve 97. The slide fit with which the plate cam 98 is seated on the journal 100 is of such a nature that the journal 100, on the one hand, rotates without noteworthy friction when the plate cam 98 is blocked and, on the other hand, entrains the plate cam 98 without slippage in the position assumed relative to the recording drum 9 when the locking pin 104 is released, whereby no further valves 97 are actuated given continued rotation of the drum.

The operation of the vacuum distributor shall be set forth in greater detail with reference to FIGS. 9 through 14.

Figure 9:
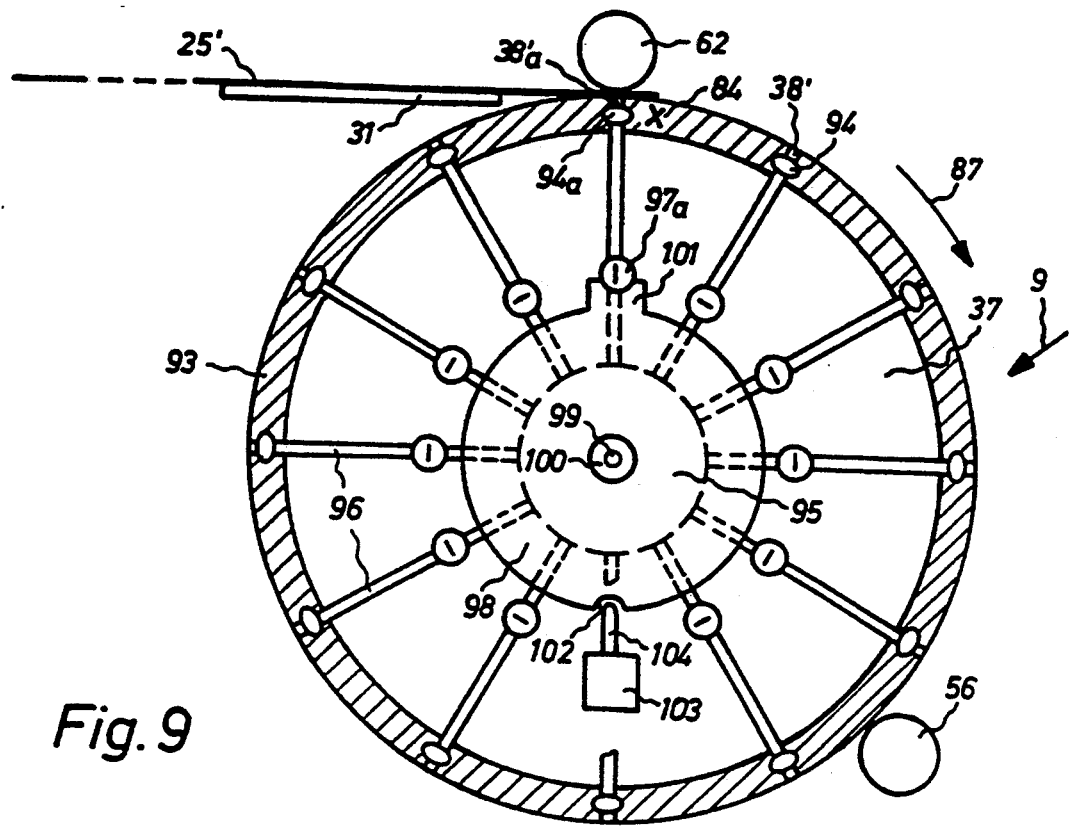
FIG. 9 shows the operation of the vacuum distributor at the beginning of the clamping process, whereby the recording drum is situated in the start of clamping position.

FIG. 9 shows the beginning of the clamping process for a film proof 25', whereby the recording drum 9 shown in section is situated in a start of clamping position.

In the start of clamping position of the recording drum 9, the clamping marked 84 lies in the region of the pressure roller 62 in which the start of the film proof 25' conveyed to the recording drum 9 comes into contact with the drum surface.

The recording drum 9 was turned into the start of clamping position by the frictional wheel 56 of the positioning drive 57 pivoted in against the drum surface, the recording drum 9 initially remaining in this start of clamping position since the positioning drive 57 has been shut off.

The plate cam 98 is blocked by the locking pin 104 in that position relative to the start of clamping position of the recording drum 9 wherein the control finger 101 opens the valve 97a. As a result thereof, only the suction channel 94a lying in the region of the clamping mark 84 is charged with vacuum when the vacuum pump 44 is cut in and the starting region of the film proof 25' to be clamped is fixed on the drum surface by the appertaining suction hole row 38'a.

Since only the suction hole row 38'a belonging to the suction channel 94a is charged with vacuum at this time, the vacuum takes effect there with its full nominal value, as a result whereof a slipping of the starting region of the film proof 25' from its exact position in the initial phase of the film clamping is advantageously avoided.

After the starting region of the film proof 25' has been fixed on the suction hole row 38'a, the positioning drive 57 is again switched on and the recording drum 9 is turned out of the start of clamping position in the direction of the arrow 87, as a result whereof, the film proof 25' is pulled from the film conveying surface 31 and is placed around the turning recording drum 9 with increasing wrap.

Figure 10:
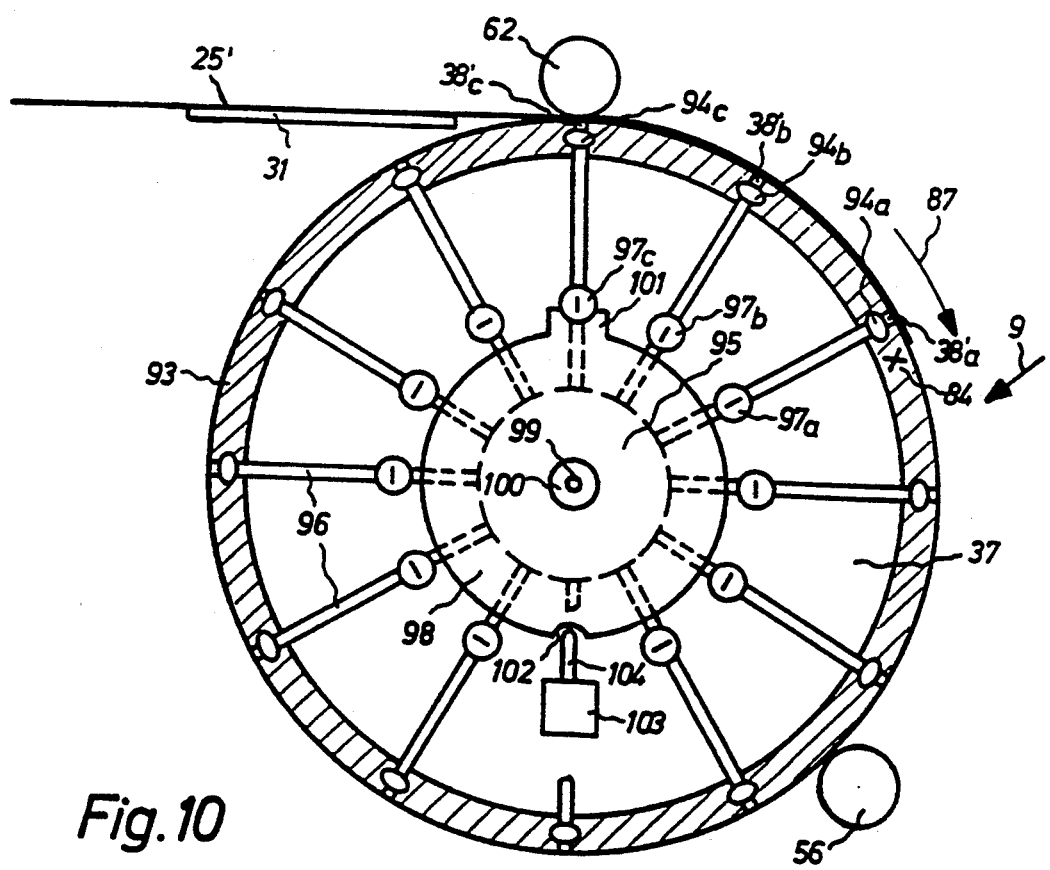
FIG. 10 shows the operation of the vacuum distributor in the clamping process while the cut-off film proof is being fixed on the recording drum.

FIG. 10 shows an advanced stage of the clamping process wherein the valves 97b and 97c have also moved successively past the control finger 101 of the blocked plate cam 98 and have thus been opened by turning the recording drum 9 in the direction of the arrow 87, so that the suction hole rows 38'b and 38'c belonging to the suction channels 94b and 94c have now been additionally charged with vacuum in accordance with the momentary wrap of the film proof 25' around the recording drum 9.

Figure 11:
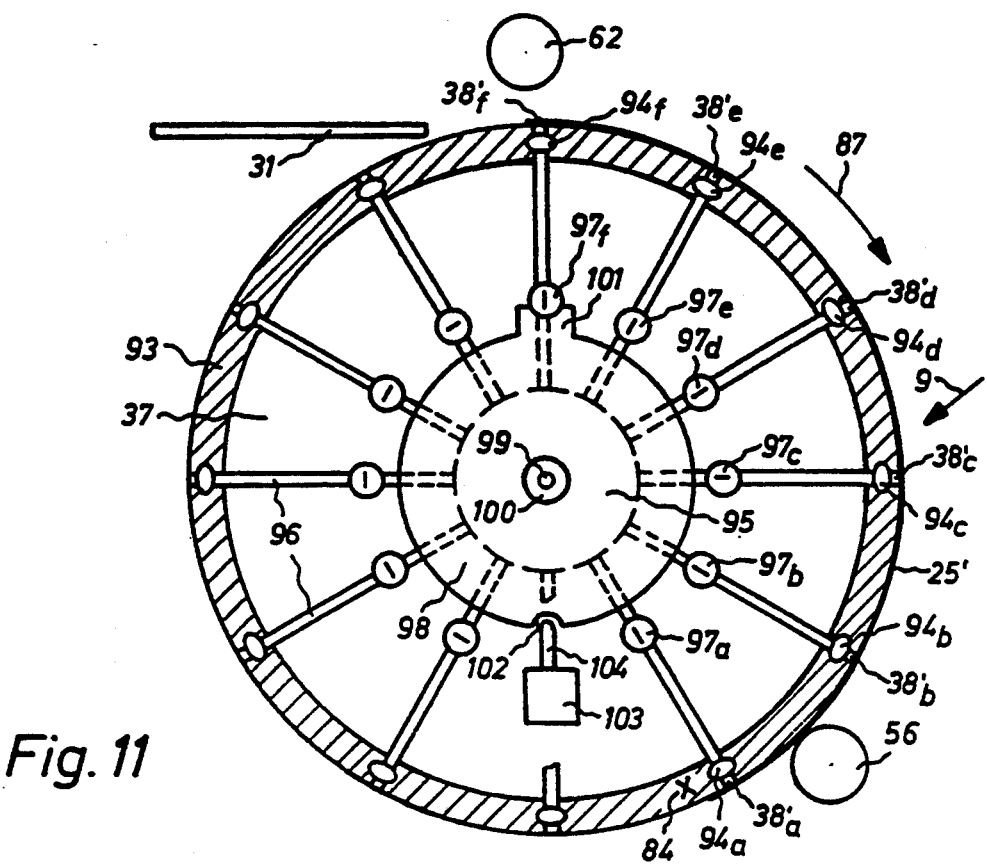
FIG. 11 illustrates the operation of the vacuum distributor at the end of the clamping process.

FIG. 11 shows the clamping process at that time whereat the film proof 25 has already been entirely clamped by turning the recording drum 9 in the direction of the arrow 87 and by step-by-step cut-in of the suction hole rows 38'b and 38'c belonging to the suction channels 94b through 94f.

The clamping behavior is significantly improved by the step-by-step cut-in of the suction hole rows 38'. Since the full vacuum valve takes effect only at the respectively added suction hole row 38' at which film proof 25' and drum surface momentarily contact and since the free end of the film proof 25' has not yet been suctioned in, it can freely center during the clamping, this advantageously guaranteeing an exact and fold-free clamping of, in particular, long film proofs. The clamping behavior can be further improved in that the nominal value of the vacuum is lowered during the clamping process by switching the secondary air valve 43 on.

After the film proof 25' has been completely clamped, the pressure roller 62 is lifted off from the drum surface and the locking pin 104 is withdrawn from the groove 102 of the plate cam 98 by the control element 103, as a consequence whereof the blocking of the plate cam 98 is cancelled. When the recording drum 9 continues to turn, the cam plate 98 now turns along with the recording drum 9, namely into the position relative to the recording drum 9 assumed when the cam plate 98 is released. As a result thereof, a relative motion between the valves 97 and the control finger 101 of the plate cam 98 no longer occurs; no further valves 98 are opened and no further suction hole rows 38' are added in.

Only as many suction hole rows 38' are thus respectively charged with vacuum as are in fact also circumferentially covered by the film proof 25' clamped on at the moment, whereby the remaining suction hole rows 38' are disconnected. A reliable fixing of the film proofs 25' of different formats on the recording drum 9 is thereby guaranteed due to the low vacuum losses, particularly in the exposure phase wherein the recording drum 9 turns at high speed.

The switch signal for the control element 103 with which the blocking of the plate cam 98 is cancelled given complete clamping of the film proofs 25' of different formats can be automatically generated.

For example, a clock generator is coupled to the recording drum 9 in this case, this clock generator generating a clock sequence when the recording drum 9 rotates. The clocks counted beginning from the start of clamping position of the recording drum 9 are a measure for the momentary rotational angle of the recording drum 9 and, thus, for that length of the film proof 25' clamped at the moment. The respective format length of the film proof 25' to be clamped on is prescribed as a number of clocks. The counted clocks of the clock generator are then continuously compared to the prescribed plurality of clocks and the switch signal for the control element 103 is generated given clock equality.

Figure 12:
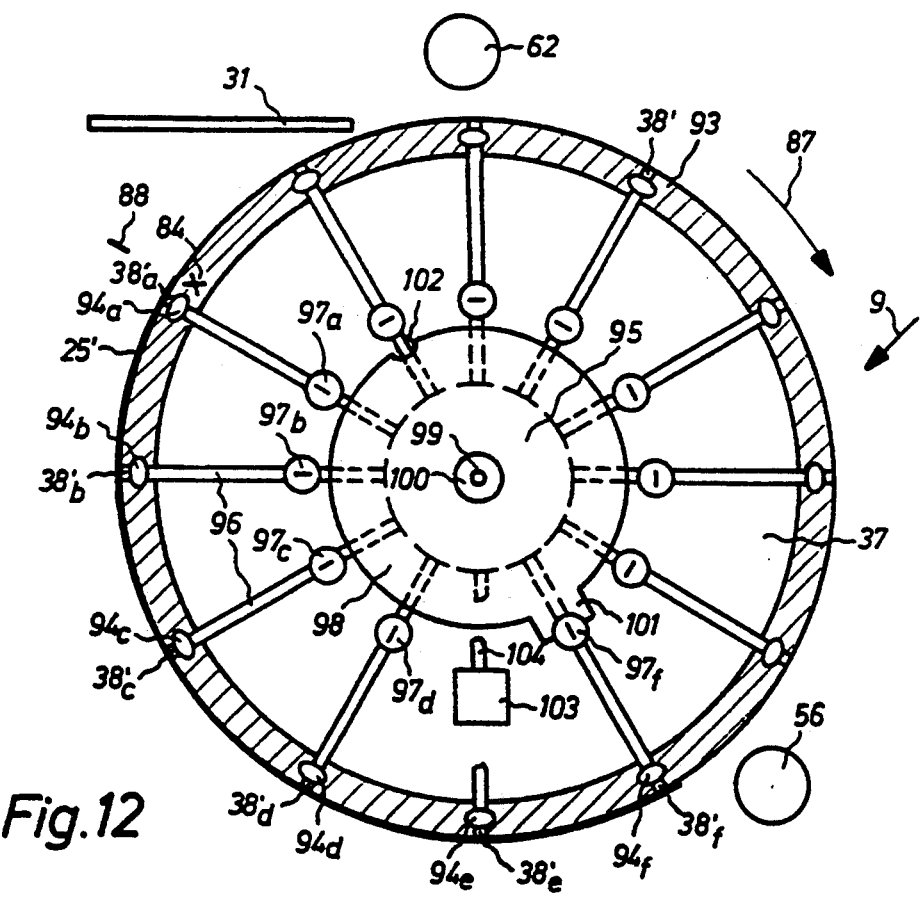
FIG. 12 shows the operation of the vacuum distributor at the beginning of the exposure phase.

FIG. 12 shows the recording drum 9 at that time at which it has already turned into the start of exposure position on the basis of the positioning drive 57 and the positioning drive 57 has been shut off. In the start of exposure position, the start mark 84 on the recording drum is coincident with the optical axis 88 of the recording element 48.

It may be seen from the figure that no further suction hole rows 38' are added in due to the rotation of the recording drum 9 into the start of exposure position since the control finger 101 of the plate cam 98 remains at the valve 97*f*.

The release process of the exposed film proof 25' from the recording drum 9 ensues after the exposure.

Figure 13:
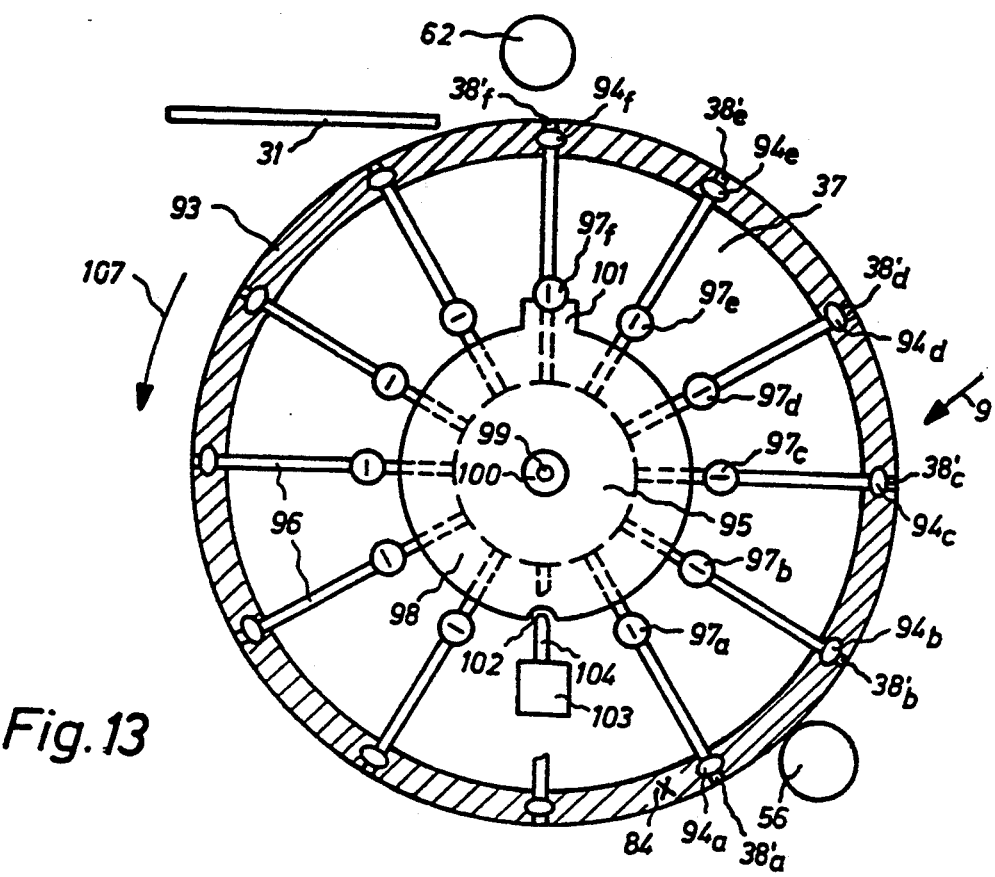
FIG. 13 shows the operation of the vacuum distributor during the release process.

FIG. 13 shows the recording drum 9 after the release of the exposed film proof 25'.

The valves 97*a* through 97*f* previously opened during release are still open at this time and must be closed to prepare for a new clamping process.

For that purpose, the positioning drive 57 is again pivoted against the recording drum 9 and started. The recording drum 9 together with the cam plate 98 turn in the direction of an arrow 107 in a direction opposite that during the clamping process. The lock pin 105 is moved relative to the plate cam 98 as a result of a switch signal at the control element 103. The lock pin 104 first glides on the edge of the rotating plate cam 98 until it falls into the groove 102 and blocks the plate cam 98.

Figure 14:
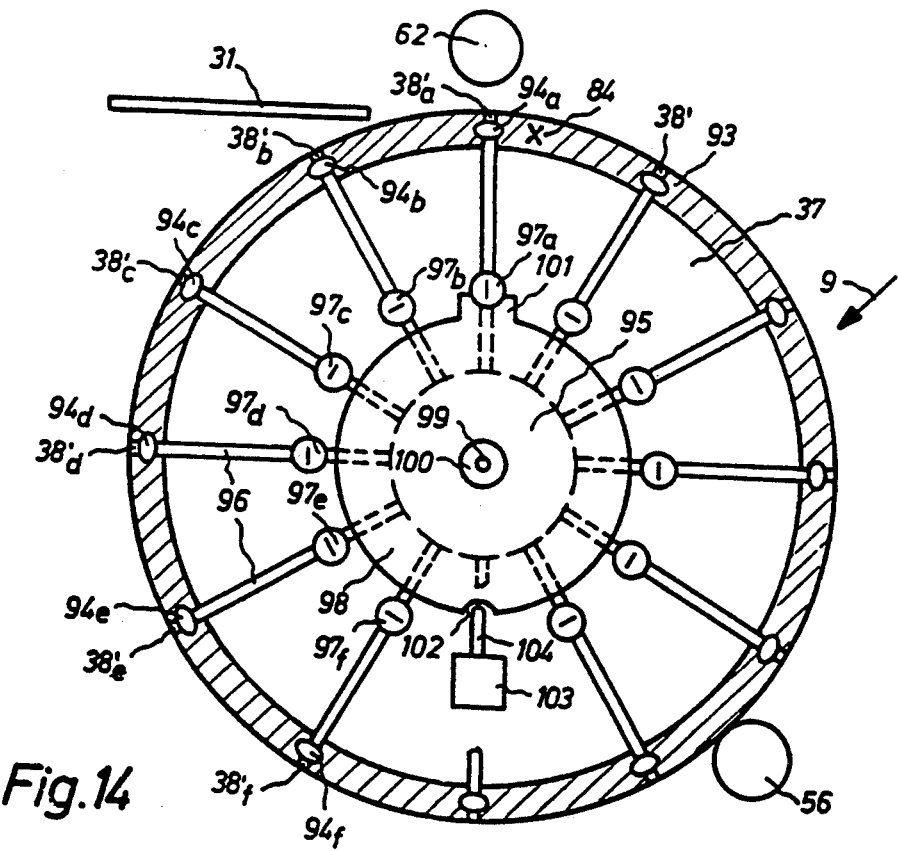
FIG. 14 shows the operation of the vacuum distributor at the end of the release phase.

As a result of continued rotation of the recording drum 9 in the direction of the arrow 107, the valves 97*f* through 97*a* then successively move past the control finger 101 of the blocked plate cam 98 and are closed by the control finger 101. This situation is shown in FIG. 14.

When the release of the exposed film proofs is to ensue with step-by-step vacuum disconnect of the individual suction hole rows, the recording drum 9 turns in the direction of the arrow 87.

Figure 15:
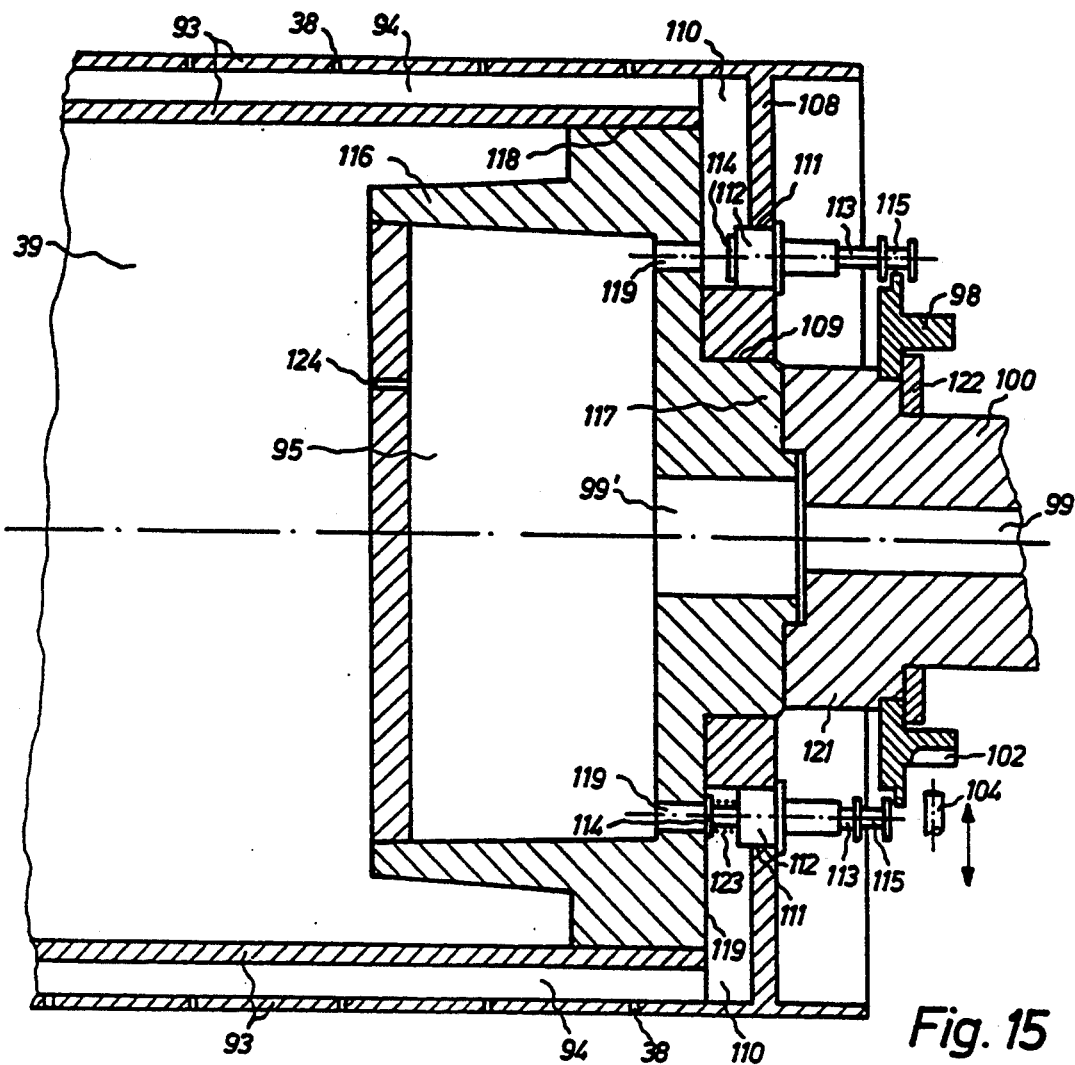
FIG. 15 illustrates an exemplary embodiment of the recording drum with vacuum distributor.

FIG. 15 shows a practical exemplary embodiment of the vacuum distributor in a longitudinal section through the recording drum 9 fashioned as a hollow cylinder.

Two of the suction channels 94 are visible in the wall 93 of the hollow cylinder 39, these suction channels 94 being connected to the suction holes 38. The end face of the hollow cylinder 39 is closed by a cover 108 that comprises a central opening 100. The inside of the cover 108 is provided with radially proceeding grooves 110 that are in communication with the suction channels 94. The outside of the cover 108 comprises bores 111 that are circularly arranged around the drum axis and discharge into the radially proceeding grooves 110. The bores 111 accept the bodies 112 of the valves 97. A tappet 113 is movable in the body 112 of a valve 97, this tappet 113 carrying a circular sealing surface 114 at one end and carrying a control roller 115 at its other end.

A cylindrical housing part 116 whose shoulder 117 is fitted into the opening 109 of the cover 108 is situated in the hollow cylinder 39. The circumferential surface 118 of the housing part 116 is connected air-tight to the inside surface of the hollow cylinder 39 and the end face 119 of the housing part 116 is connected air-tight to the inside surface of the cover 108. The grooves 110 in the cover 108 covered air-tight by the end face 119 of the housing part 116 form the distributor lines 96. The journal 100 is secured to the shoulder 117 of the housing part 116. The interior of the housing part 116 forms the vacuum chamber 95 that is connected to the suction bore 99 in the journal 110 via the suction bore 99 in the housing part 116. At its end face 119, the housing part 116 comprises bores 120 circularly arranged around the drum axis that lie opposite the valves 47 and that can be closed by the sealing faces 114 of the valves 97.

The plate cam 98 is seated in a slide fit with a disc 122 on the shoulder 121 of the journal 100. The groove 102 into which the lock pin 104 can be introduced may be seen at the plate cam 98.

In FIG. 15, the upper valve 97 is opened by the control finger 101 of the plate cam 98 in that the sealing face 114 releases the appertaining bore 120, as a result whereof a connection between the vacuum chamber 95 and the upper suction channel 94 is produced via the bore 120 and the distributor line 96. The lower valve 97, by contrast, is closed in that the sealing face 114 of the valve 97 is pressed against the corresponding bore 120 with a spring 123, as a result whereof the connection between vacuum chamber 95 and lower suction channel 94 is interrupted. As a result of the spring 123, the valve 97 has a stable work position in the closed condition. The control of the valves 97 by the plate cam 98 shall be set forth in yet greater detail with reference to FIG. 16.

The housing part 117 can additionally comprise a throttling port 124 that connects the vacuum chamber 95 to the interior of the drum. As a result of the throttling port 124, a vacuum is also gradually built up in the interior of the drum when the vacuum chamber 95 is evacuated, this serving as vacuum store. What the vacuum store effects is that the vacuum is slowly reduced at the suction holes 38 when the vacuum pump is shut off.

FIG. 16 illustrates the control of the valves 97 by the plate cam 98. The control finger 101 of the plate cam 98—this control finger 101 having been only schematically indicated up to now—is fashioned as a "switch" for the control roller 115 of the valve 97.

Figure 16A:
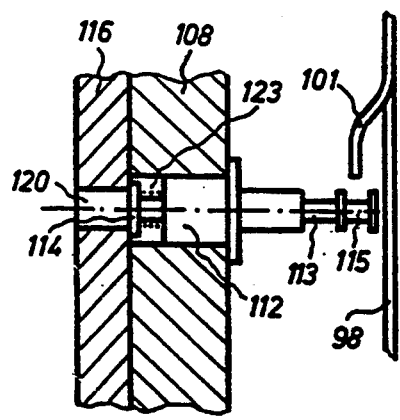
FIG. 16 shows the control of the valves.
Figure 16B:
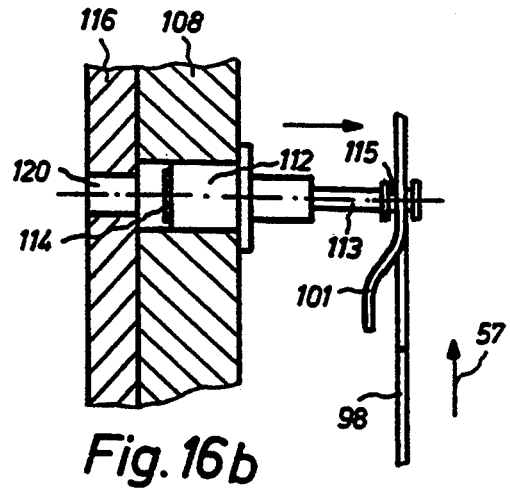

In FIG. 16a, the control roller 115 of the valve 97 has not yet reached the control finger 101 of the plate cam 98. The valve 97 remains in the stable, "closed" work position wherein the sealing face 114 seals the bore 120.

in FIG. 16b, the control roller 115 of the valve 97 has been seized by the control finger 101 of the plate cam 98 due to a motion of the valve 97 in the direction of an arrow 125 and has glided onto the plate cam 98, as a consequence whereof the tappet 113 of the valve 97 executes a lifting motion. As a result of this lifting motion of the tappet 113, the valve 97 now assumes the "opened" work position wherein the sealing face 114 releases the bore 120.

As a result of the fact that the control roller 115 now rolls on the plate cam 98, the valve 97 is fixed in the "opened" work position. As a result of a relative motion in the opposite direction, the control roller 115 of the valve 97 can be conducted over the control finger 110 into the stable "closed" work position.

Figure 17:
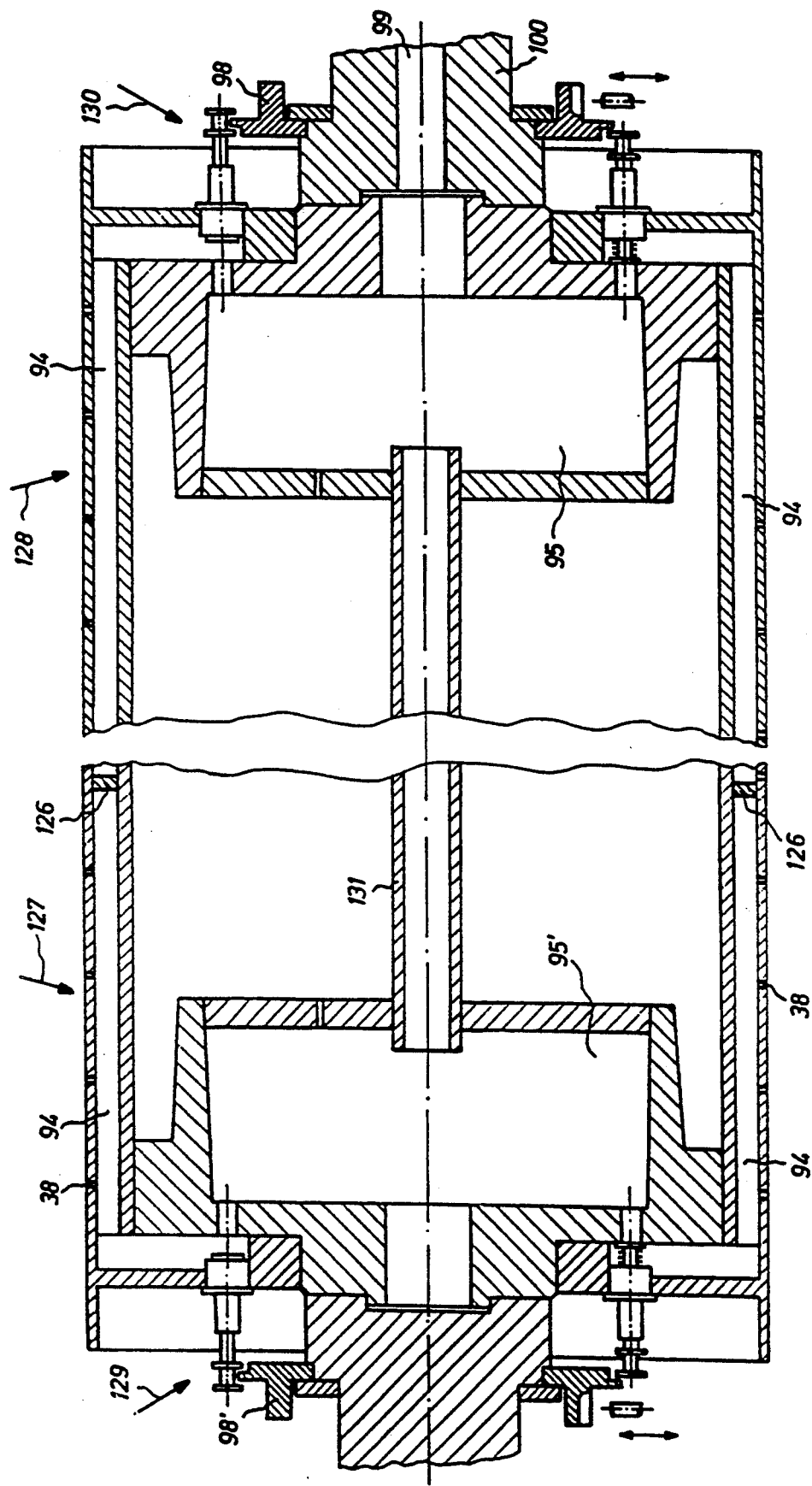
FIG. 17 is another exemplary embodiment of the recording drum with vacuum distributor.

FIG. 17 shows another exemplary embodiment of the clamping device wherein the recording drum 1 is subdivided by bulkheads 126 in the suction channels 94 into two vacuum regions 127 and 128 lying axially side-by-side, these being separately chargeable with vacuum.

Both vacuum regions 127 and 128 are controllable with separate vacuum distributors 129 and 130. As shown and described in FIG. 17, the vacuum chamber 95 of the vacuum distributor 130 is connected to the vacuum pump 44 via the suction bore 99 in the journal 100. By contrast, the vacuum chamber 95' of the vacuum distributor 129 is supplied with vacuum via a tube conduit 131 from the vacuum chamber 95 of the vacuum distributor 130. Both vacuum regions 127 and 128 can be separately controlled by plate cams 98 and 98', as a result whereof, the vacuum losses can be advantageously kept low even given different format widths of the film proofs to be clamped on.

When a film proof having a smaller format width than the width of a vacuum region is to be clamped on, only one of the vacuum regions is activated. The other vacuum region then remains disconnected in that the plate cam of the corresponding vacuum region is not blocked during the clamping process, no valves being opened as a result thereof.

When two film proofs having small format width but identical format length or one film proof whose format width is greater than the width of a vacuum region is to be clamped on, both vacuum regions are activated and the automatic cut-in of the suction hole rows is synchronously controlled.

When two film proofs having a small format width but with different format lengths are to be clamped on, the cut-in of the suction hole rows can be advantageously separately controlled in the two vacuum regions in accordance with the respective format length.

Although various minor changes and modifications might be proposed by those skilled in the art, it will be understood that we wish to include within the claims of the patent warranted hereon all such changes and modifications as reasonably come within our contribution to the art.

We claim:

1. An apparatus for automatically clamping film onto a recording drum of a reproduction device and for removing the film exposed by a recording element from the recording drum, comprising:

the recording drum being arranged in a light-tight space of the reproduction device;

a peripheral surface of the recording drum having means for vacuum-fixing of the film material comprising suction holes, said suction holes being arranged in suction hole rows proceeding substantially parallel relative to an axis of the drum, and the suction hole rows being connected to a stationary vacuum pump;

a roll film cassette that contains a web of the film as a rotatable film roll and is provided with a slot-shaped film passage opening which closes light-tight, said roll film cassette being receivable into the light-tight space of the reproduction device and means being provided for locking the cassette in said light-tight space, and the film passage opening being aligned toward the recording drum and having a longitudinal extent proceeding substantially parallel to the drum axis;

a conveying and guide surface means arranged between the film passage opening of the roll film cassette and the recording drum for receiving the film web unwound from the film roll and for guiding the web substantially tangentially relative to the recording drum in a region of the recording drum;

film conveying means for conveying the film web out of the roll film cassette and to the recording drum;

film cutting means arranged between the roll film cassette and the recording drum for cutting the film web a film sheet of a prescribed length to be respectively exposed;

a film length measuring means arranged between the roll film cassette and the recording drum for identifying a length of the film web that has respectively passed therethrough;

pressure means comprising a pressure roller that is pivotable against the recording drum in a region where a start of the film web conveyed via the conveying and guide surface means to the recording drum comes into contact with the drum surface;

a positioning drive means for turning the recording drum to start of clamping, start of exposure and start of release positions;

a lift-off means comprising a lift-off finger pivotable against the recording drum for peeling a respectively exposed sheet of film from the recording drum;

suction channels proceeding substantially parallel relative to the drum axis in the recording drum, each of said suction channels connecting the suction holes of a suction hole row to one another;

a vacuum distributor means controllable by rotational motion of the recording drum for connecting each of said suction channels to the stationary vacuum pump via a suction line that during clamping, a suction hole row on which a starting region of the film sheet lies is first charged with vacuum, further suction hole rows are then successively added and charged with vacuum in accordance with increasing wrap of the turning recording drum by the film sheet, and said addition of further suction hole rows occurring in accordance with a respective circumferential length of the film sheet to be clamped on;

the light-tight space of the reproduction device comprising a loading flap means for introduction of the roll film cassette and for closing in light-tight locking fashion;

a device carrier comprising an elevating platform means for depositing the roll film cassette inside the light-tight space; and means for aligning the roll film cassette relative to the recording drum.

2. An apparatus according to claim 1 wherein a controllable secondary air valve means is inserted into the suction line for reducing the vacuum during the clamping or release of the film.

3. An apparatus according to claim 1 wherein the roll film cassette comprises sealing rollers arranged above and below the film web for a light seal in a region of the film passage opening, a length of said sealing rollers being at least corresponding to said longitudinal extent of the film passage opening.

4. An apparatus according to claim 1 wherein
the film conveying means is composed of conveyor rollers arranged in the roll film cassette above and below the film web, at least one of said conveyor rollers being drivable by a film conveying motor;
the film conveying motor being stationarily secured to a device carrier of the reproduction device; and
the driven conveyor roller being connectable to the film conveying motor through a wall of the roll film cassette.

5. An apparatus according to claim 1 wherein a shaft of the film roll in the roll film cassette is coupled to a winding motor means for conveying unwound film web back into the roll film cassette and winding it up onto the film roll.

6. An apparatus according to claim 5 wherein means is provided for generating a counter-torque by constant excitation of said winding motor means for tensing the film web between the film roll and conveyor rollers of said film conveying means, said conveyor rollers having a given torque.

7. An apparatus according to claim 1 wherein
the roll film cassette is composed of a lower part and of a removable cover that closes light-tight; and
respectively one roller of a pair of sealing rollers at said film passage opening and one roller of a pair of conveying rollers of said film conveyor means are seated in the lower part of the roll film cassette and the other respective rollers are seated in the cover.

8. An apparatus according to claim 1 wherein the film cutting means for the film web is designed as a circular knife that can be moved in rotating fashion along the cut line transversely relative to the film web.

9. An apparatus according to claim 1 wherein film length measuring means comprises a measuring wheel driven by the motion of the film web, a supporting wheel resiliently pressing the film web against the measuring wheel, and a rotational pulse generator means coupled to the measuring wheel, said rotational pulse generator means converting rotation of the measuring wheel into a clock sequence such that a number of clocks is a measure for measured film length.

10. An apparatus according to claim 1 wherein
the light-tight space comprises a slot-shaped film exit opening positioned to receive the exposed film sheets in a region of the lift-off means;
the lift-off means being provided with a film guiding channel that points in a direction of a film exit opening when the lift-off finger is pivoted against the recording drum; and
a drivable pair of film conveying rollers between the lift-off means and the film exit opening positioned to convey exposed film sheets out of the light-tight space through the film exit opening.

11. An apparatus according to claim 1 wherein a sleeve film cassette means for accepting exposed film sheets is connected light-tight to a film exit opening of the light-tight space.

12. An apparatus according to claim 1 wherein a film conveying channel of a film developing station is connected light-tight to a film exit opening of the light-tight space.

13. An apparatus according to claim 1 wherein a vacuum meter means is inserted into the suction line, said vacuum meter means generating an electrical measured signal for vacuum monitoring of said suction line.

14. An apparatus according to claim 1 wherein the vacuum distributor means comprises
a vacuum chamber in the recording drum which is in communication with the stationary vacuum pump via a journal of the recording drum;
distributor lines between the vacuum chamber and the individual suction channels, said distributor lines proceeding substantially radially relative to the drum axis;
controllable valve means in the distributor lines for selective opening and closing of the distributor lines; and
means for controlling the valve means dependent on rotary motion of the recording drum.

15. An apparatus according to claim 1 wherein
the suction channels in the recording drum comprise partitions which subdivide the recording drum into two separate vacuum regions; and
each vacuum region having a separately controllable vacuum distributor allocated to it.

16. An apparatus according to claim 15 wherein the vacuum chamber for one of the vacuum distributors is connected to a vacuum chamber of the other vacuum distributor via a tube proceeding axially in an interior of the drum.

17. An apparatus for automatically clamping film onto a recording drum of a reproduction device and for removing the film exposed by a recording element from the recording drum, comprising:
the recording drum being arranged in a light-tight space of the reproduction device;
a peripheral surface of the recording drum having means for vacuum fixing of the film material comprising suction holes, said suction holes being arranged in suction hole rows proceeding substantially parallel relative to an axis of the drum, and the suction hole rows being connected to a stationary vacuum pump;

a roll film cassette that contains a web of the film as a rotatable film roll and is provided with a slot-shaped film passage opening which closes light-tight, said roll film cassette being receivable into the light-tight space of the reproduction device and means being provided for locking the cassette in said light-tight space, and the film passage opening being aligned toward the recording drum and having a longitudinal extent proceeding substantially parallel to the drum axis;

a conveying and guide surface means arranged between the film passage opening of the roll film cassette and the recording drum for receiving the film web unwound from the film roll and for guiding the web substantially tangentially relative to the recording drum in a region of the recording drum;

film conveying means for conveying the film web out of the roll film cassette and to the recording drum;

film cutting means arranged between the roll film cassette and the recording drum for cutting the film web a film sheet of a prescribed length to be respectively exposed;

a film length measuring means arranged between the roll film cassette and the recording drum for identifying a length of the film web that has respectively passed therethrough;

pressure means comprising a pressure roller that is pivotable against the recording drum in a region where a start of the film web conveyed via the conveying and guide surface means to the recording drum comes into contact with the drum surface;

a positioning drive means for turning the recording drum to start of clamping, start of exposure and start of release positions;

a lift-off means comprising a lift-off finger pivotable against the recording drum for peeling a respectively exposed sheet of film from the recording drum;

suction channels proceeding substantially parallel relative to the drum axis in the recording drum, each of said suction channels connecting the suction holes of a suction hole row to one another;

a vacuum distributor means controllable by rotational motion of the recording drum for connecting each of said suction channels to the stationary vacuum pump via a suction line that during clamping, a suction hole row on which a starting region of the film sheet lies is first charged with vacuum, further suction hole rows are then successively added and charged with vacuum in accordance with increasing wrap of the turning recording drum by the film sheet, and said addition of further suction hole rows occurring in accordance with a respective circumferential length of the film sheet to be clamped on;

the vacuum distributor means comprising
  a vacuum chamber in the recording drum which is in communication with the stationary vacuum pump via a journal of the recording drum,
  distributor lines between the vacuum chamber and the individual suction channels, said distributor lines proceeding substantially radially relative to the drum axis,
  controllable valve means in the distributor lines for selective opening and closing of the distributor lines, and
  means for controlling the valve means dependent on rotary motion of the recording drum; and
said means for controlling the valve means comprising
  a plate cam seated on a journal of the recording drum and having a control finger means as an actuation element for opening and closing the valve means and which are circularly arranged around the plate cam, and
  an interlock means for blocking the plate cam in a prescribed, stationary position relative to the recording drum, the plate cam being seated on the journal by a slide fit such that the plate cam not blocked by the interlock means is entrained by the journal of the rotating recording drum without slippage.

18. An apparatus according to claim 17 wherein the interlock means comprises a lock pin adjustable by a stationary control element, said lock pin engaging into a groove situated at the plate cam.

19. An apparatus according to claim 17 wherein
  the valve means are respectively controllable into an opened work position by actuating a control roller secured to a tappet with the control finger means of the plate cam, the valve means assuming a stable work position of closed without actuation of the control roller by the control finger means.

20. An apparatus for automatically clamping film onto a recording drum of a reproduction device and for removing the film exposed by a recording element from the recording drum, comprising:
  the recording drum being arranged in a light-tight space of the reproduction device;
  a peripheral surface of the recording drum having means for vacuum fixing of the film material comprising suction holes, said suction holes being arranged in suction hole rows proceeding substantially parallel relative to an axis of the drum, and the suction hole rows being connected to a stationary vacuum pump;
  a roll film cassette that contains a web of the film as a rotatable film roll and is provided with a slot-shaped film passage opening which closes light-tight, said roll film cassette being receivable into the light-tight space of the reproduction device and means being provided for locking the cassette in said light-tight space, and the film passage opening being aligned toward the recording drum and having a longitudinal extent proceeding substantially parallel to the drum axis;
  a conveying and guide surface means arranged between the film passage opening of the roll film cassette and the recording drum for receiving the film web unwound from the film roll and for guiding the web substantially tangentially relative to the recording drum in a region of the recording drum;
  film conveying means for conveying the film web out of the roll film cassette and to the recording drum;
  film cutting means arranged between the roll film cassette and the recording drum for cutting the film web a film sheet of a prescribed length to be respectively exposed;

a film length measuring means arranged between the roll film cassette and the recording drum for identifying a length of the film web that has respectively passed therethrough;

pressure means comprising a pressure roller that is pivotable against the recording drum in a region where a start of the film web conveyed via the conveying and guide surface means to the recording drum comes into contact with the drum surface;

a positioning drive means for turning the recording drum to start of clamping, start of exposure and start of release positions;

a lift-off means comprising a lift-off finger pivotable against the recording drum for peeling a respectively exposed sheet of film from the recording drum;

suction channels proceeding substantially parallel relative to the drum axis in the recording drum, each of said suction channels connecting the suction holes of a suction hole row to one another;

a vacuum distributor means controllable by rotational motion of the recording drum for connecting each of said suction channels to the stationary vacuum pump via a respective suction line that during clamping, a suction hole row on which a starting region of the film sheet lies is first charged with vacuum, further suction hole rows are then successively added and charged with vacuum in accordance with increasing wrap of the turning recording drum by the film sheet, and said addition of further suction hole rows occurring in accordance with a respective circumferential length of the film sheet to be clamped on;

the recording drum being designed as a hollow cylinder in a wall of which suction channels proceed and said drum having end faces which are closed by disc-shaped covers, at least one of said covers has a central opening;

an inside surface of at least one of the covers directed into an interior of the drum comprising substantially radially proceeding grooves;

an outside surface of the at least one cover being provided with bores circularly arranged around the drum axis, said bores discharging into the grooves, and valves being attached to the suction lines;

a cylindrical housing part secured to the inside surface of the at least one cover and said housing part having its shoulder secured in the central opening of the at least one cover, the grooves in the cover being sealed air-tight by the housing part to form distributor lines connected to the suction channels;

a groove that comprises a suction bore is secured to said shoulder of the housing part projecting through said opening of the at least one cover;

an interior of the housing part forming a vacuum chamber that is in communication with the suction bore in a journal via the suction bore in the housing part;

an end face of the housing part being directed toward the at least one cover comprises circularly arranged bores that connect the vacuum chamber to grooves and that are arranged such that they can be closed by the valves; and said vacuum distribution means comprising a plate cam seated at a shoulder of the journal and which controls said valves.

21. An apparatus for automatically clamping film onto a recording drum of a reproduction device and for removing the film exposed by a recording element from the recording drum, comprising:

the recording drum being arranged in a space of the reproduction device;

a peripheral surface of the recording drum having means for vacuum-fixing of the film material comprising suction holes distributed over an entire circumference of the recording drum, said suction holes being arranged in suction hole rows proceeding substantially parallel relative to an axis of the drum, and the suction hole rows being connected to a vacuum chamber in an interior of the drum which is connected to a vacuum source via separate distributor lines;

a roll film cassette that contains a web of the film as a rotatable film roll and is provided with a film passage opening, said roll film cassette being receivable into the space of the reproduction device, and the film passage opening being aligned toward the recording drum;

guide means arranged between the film passage opening of the roll film cassette and the recording drum for receiving the film web unwound from the film roll and for guiding the web substantially tangentially relative to the recording drum in a region of the recording drum;

film cutting means arranged between the roll film cassette and the recording drum for cutting from the film web a film sheet of a prescribed length to be respectively exposed;

a film length measuring means identifying a length of the film web that has respectively passed therethrough;

pressure means that presses against the recording drum in a region where a start of the film web conveyed via the guide means to the recording drum comes into contact with the drum surface;

a positioning drive means for turning the recording drum to start of clamping, start of exposure and start of release positions;

a lift-off means for peeling a respectively exposed sheet of film from the recording drum;

suction channels in recording drum connected to the suction holes; and a vacuum distributor means having valves connected between said distributor lines and vacuum source for connecting the suction channels to the vacuum source via said distributor lines in synchronism with rotation of said drum such that during clamping, a suction hole row on which a starting region of the film sheet lies is first charged with vacuum by opening corresponding valve of said suction hole row, further suction hole rows are then successively added and charged with vacuum by opening corresponding valves of said further suction hole rows in accordance with increasing wrap of the turning recording drum by the film sheet, said addition of further suction hole rows occurring in accordance with a respective circumferential length of the film sheet to be clamped on, and for release of said film sheet after exposure, said vacuum distributor means turning off vacuum on a successive row-by-row basis.

22. A method for automatically clamping film onto a recording drum arranged in a light-tight space of a reproduction device and for releasing the film exposed by a recording element from the recording drum, suction hole rows being provided in a generated surface of the drum which proceed substantially parallel to an axis thereof and which are connectable to a stationary vacuum pump via a suction line, comprising the steps of:
- turning the recording drum with a positioning drive to a start of clamping position, starting a film conveying means and unwinding a film web from a film roll of a roll film cassette and conveying the web via a conveying and guide surface to the recording drum;
- stopping a film conveying means when a start of the conveyed film web lies at a start of clamping position in a region of a pressure roller of a pressure means for pressing a starting region of the film web and in a region of a first suction hole row of the recording drum;
- lowering the pressure roller of the pressure means for pressing a starting region of the film web onto the recording drum;
- charging the first suction hole row with vacuum by a vacuum distributor so as to apply suction in the starting region of the film web;
- starting the film conveying means and a positioning drive for turning the recording drum and conveying further film web to the recording drum;
- while clamping the film web on measuring a length of the film web in means for measuring the film length and stopping the film conveying means as well as the positioning drive when an end of a film sheet of a given length that is to be cut off from the film web lies under a film cutting means for cutting means,
- cutting off the film sheet from the film web by the film cutting means and damping a remaining part of the film sheet with the positioning drive given step-by-step addition of further suction hole rows by a vacuum distributor;
- through a rotation of the drum, and during rotation, successively adding in further suction hole rows by the vacuum distributor and charging the suction hole rows with vacuum in accordance with an increasing wrap of the turning recording drum by the film web, and fixing the film web on the recording drum by the vacuum;
- ending add-in of further suction hole rows by the vacuum distributor in accordance with a respective circumferential length of the film sheet at a suction hole row at which an end region of the film sheet lies, and then lifting off the pressure roller of the pressure means from the recording drum;
- exposing the clamped on film sheet point-by-point and line-by-line by the recording element;
- lowering a nominal value of vacuum provided for the exposure by opening a secondary air valve for a duration of clamping, as a result whereof the film sheet is suctioned on with reduced vacuum;
- measuring an actual value of the vacuum and a reduced actual value for the reduced vacuum with a vacuum gauge, comparing the measured actual values to nominal values, and, if the measured actual values do not reach the nominal values, the film web is conveyed back into the roll film cassette;
- turning the recording drum by the positioning drive into a start of release position after the exposure, and lowering the pressure roller of the pressure means and a lift-off finger of a lift-off means onto the recording drum at the start of release position;
- peeling off the exposed film sheet from the drum surface with the lowered lift-off finger by turning the recording drum; and
- disconnecting in turn suction hole rows charged with vacuum when unclamping the film sheet by the vacuum distributor, and turning the recording drum to the start of clamping position.

23. A method according to claim 22 including the further steps of:
- after fixing the start of the film web on the recording drum, only the film conveying means is started and a film loop of a prescribed length is formed by supplying additional film web from the roll film cassette at the starting region of the film web; and
- after formation of the film loop, for retention of the film loop the positioning drive for turning the recording drum is started and additional film web is conveyed to the recording drum and clamped on.

24. A method according to claim 23 including the steps of measuring a length of the additionally conveyed film web in the film length measuring means and comparing the measured film length to a prescribed length for the film loop; and stopping the film conveying means given equality.

25. A method according to claim 23 wherein when clamping the film web, a measurement of the film web length in the film length measuring means is continued proceeding from a film length previously measured and a momentarily measured film length is compared to the prescribed length for the film sheet to be respectively clamped on, taking a constant spacing between the film length measuring means and the film cutting means into consideration; and, given equality, stopping the film conveying means and the positioning drive so that the end of the film sheet to be cut off from the film web lies under the film cutting means.

26. A method according to claim 22 including the steps of measuring a length of the film web which passes through the film length measuring means and continuously comparing the measured film length to the constant spacing between the film length measuring means and a clamping mark at the start of clamping position of the recording drum; and stopping the film conveying means given equality, so that the start of the film web is situated on the clamping mark.

27. A method for automatically clamping film onto a recording drum arranged in a light-tight space of a reproduction device and for releasing the film exposed by a recording element from the recording drum, suction hole rows being provided in a peripheral surface of the drum around an entire circumference thereof which proceed substantially parallel to an axis thereof and which are connectable to a vacuum source, comprising the steps of:
- turning the recording drum with a positioning drive to a start of clamping position and unwinding a film web from a film roll of a roll film cassette and conveying the web via a guide surface to the recording drum;
- stopping a film conveying means when a start of the conveyed film web lies at a start of clamping position in a region of for pressing a starting region of the film web and in a region of a first suction hole row of the recording drum;
- lowering the means for pressing a starting region of the film web onto the recording drum;

charging a first of the suction hole rows only with vacuum by a vacuum distributor so as to suction apply in the starting region of the film web;

starting the film conveying means and a positioning drive for turning the recording drum and conveying further film web to the recording drum;

when clamping the film web on measuring a length of the film web in means for measuring the film length and stopping the film conveying means as well as the positioning drive when an end of a film sheet of a given length that is to be cut off from the film web lies under a means for cutting film;

cutting off the film sheet from the film web by the film cutting means and clamping a remaining part of the film sheet with the positioning drive given step-by-step successive row-by-row addition of further suction hole rows by a vacuum distributor through a rotation of the drum, a corresponding row having vacuum applied only after the web covers over the corresponding row, and during rotation successively adding in further suction hole rows by the vacuum distributor and charging the suction hole rows with vacuum in accordance with an increasing wrap of the turning recording drum by the film web, and fixing the film web on the recording drum by the vacuum;

ending add-in of further suction hole rows by the vacuum distributor in accordance with a respective circumferential length of the cut film sheet at a suction hole row at which an end region of the film sheet lies, and then lifting off the pressure means from the recording drum;

exposing the clamped on film by the recording element;

turning the recording drum by the positioning drive to a start of release position after the exposure, and lowering a means to lift-off the sheet onto the recording drum at a start of release position; and successively disconnecting suction hole rows charged with vacuum when unclamping the film sheet by the vacuum distributor, and turning the recording drum to the start of clamping position while stripping off the film sheet.

* * * * *